US012122504B1

(12) United States Patent
Loos et al.

(10) Patent No.: US 12,122,504 B1
(45) Date of Patent: Oct. 22, 2024

(54) SYSTEMS AND METHODS FOR PROPELLER BLADE RETENTION

(71) Applicant: Archer Aviation Inc., San Jose, CA (US)

(72) Inventors: Eric S. Loos, Glastonbury, CT (US); Danny L. Ball, Winfield, KS (US); Jacob P. Virkler, Vernon, CT (US); Matthew J. Morgan, Middletown, CT (US)

(73) Assignee: ARCHER AVIATION INC., San Jose, CA (US)

( * ) Notice: Subject to any disclaimer, the term of this patent is extended or adjusted under 35 U.S.C. 154(b) by 0 days.

(21) Appl. No.: 18/542,479

(22) Filed: Dec. 15, 2023

(51) Int. Cl.
*B64C 11/04* (2006.01)
*F01D 5/30* (2006.01)

(52) U.S. Cl.
CPC .............. *B64C 11/04* (2013.01); *F01D 5/30* (2013.01)

(58) Field of Classification Search
CPC ......... B64C 11/06; B64C 11/04; B64C 11/30; F01D 5/30; F01D 7/00
See application file for complete search history.

(56) References Cited

U.S. PATENT DOCUMENTS

| | | | |
|---|---|---|---|
| 4,762,466 A | 8/1988 | Bouiller | |
| 4,921,403 A * | 5/1990 | Poucher | F16C 19/54 416/147 |
| 5,118,256 A * | 6/1992 | Violette | F16C 27/066 416/239 |
| 5,415,527 A * | 5/1995 | Godwin | F16C 25/06 416/220 A |
| 6,015,264 A | 1/2000 | Violette | |
| 6,676,080 B2 | 1/2004 | Violette | |
| 7,112,040 B2 | 9/2006 | Debeneix | |
| 8,753,088 B2 | 6/2014 | Pfeiffer | |
| 2008/0213095 A1 | 9/2008 | Bech | |
| 2008/0279689 A1 | 11/2008 | Sebald | |
| 2009/0220344 A1 * | 9/2009 | Pfeiffer | B64C 11/06 29/889.6 |
| 2016/0368591 A1 | 12/2016 | Pawar | |
| 2018/0290728 A1 * | 10/2018 | Violette | B64C 11/06 |
| 2022/0348309 A1 * | 11/2022 | Thompson | B64C 11/32 |

* cited by examiner

*Primary Examiner* — Justin D Seabe
*Assistant Examiner* — Michael K. Reitz
(74) *Attorney, Agent, or Firm* — Finnegan, Henderson, Farabow, Garrett & Dunner LLP

(57) ABSTRACT

Apparatus, systems, and methods for a propeller blade retention system. The retention system may include a hub including a socket formed by an inner surface of the hub, a blade extending into the socket and a retention sleeve having a first portion and a second portion. The retention system may include a filler sleeve disposed between the blade and the second portion of the retention sleeve, a first bearing disposed between the second portion of the retention sleeve and the inner surface of the hub, the first bearing having a first race, and a second bearing disposed between the first portion of the retention sleeve and the inner surface of the hub, the second bearing having a second race. The retention system may include a cap comprising a body portion and a flange portion. The retention system may include a shim carrier.

20 Claims, 18 Drawing Sheets

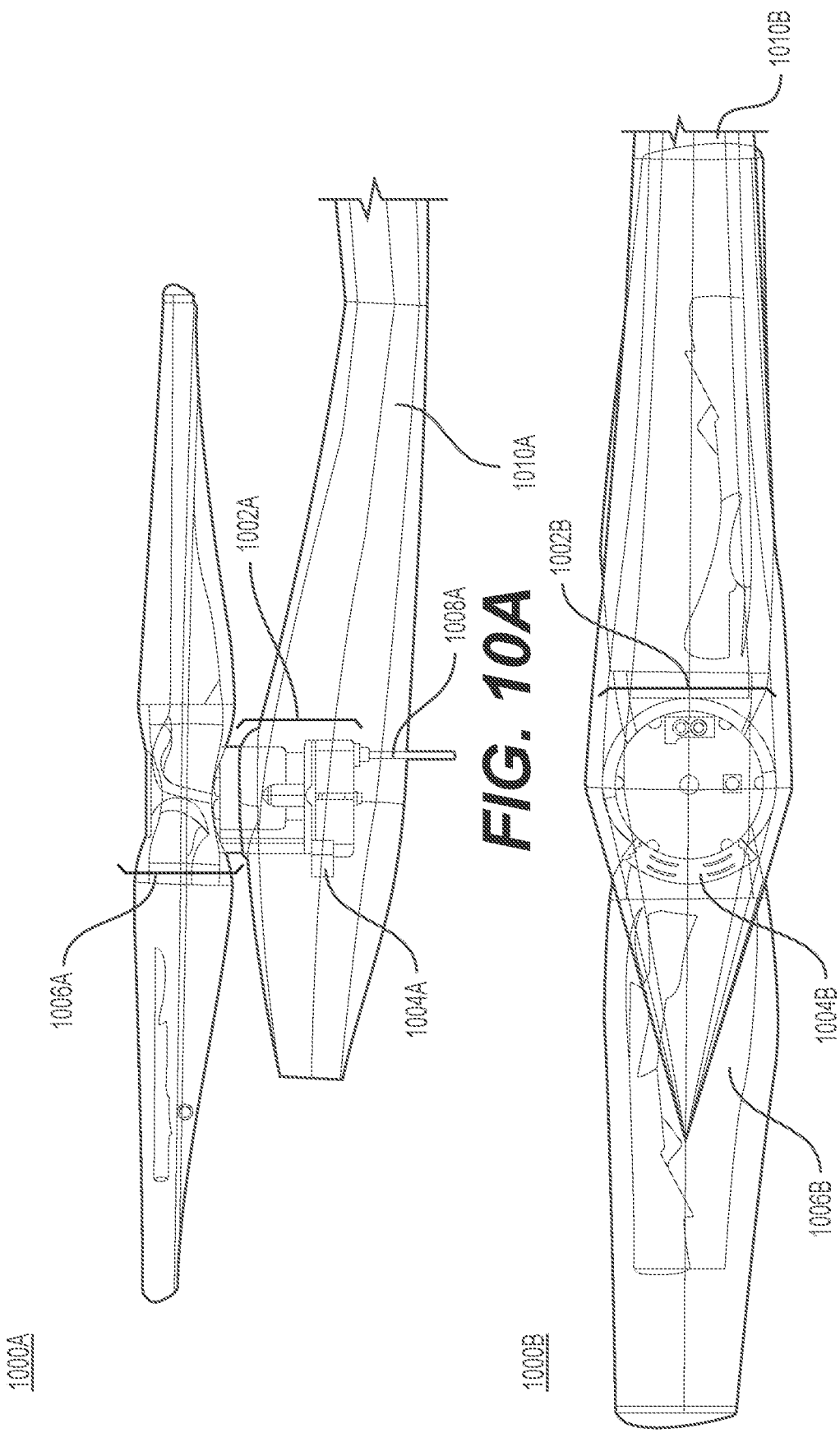

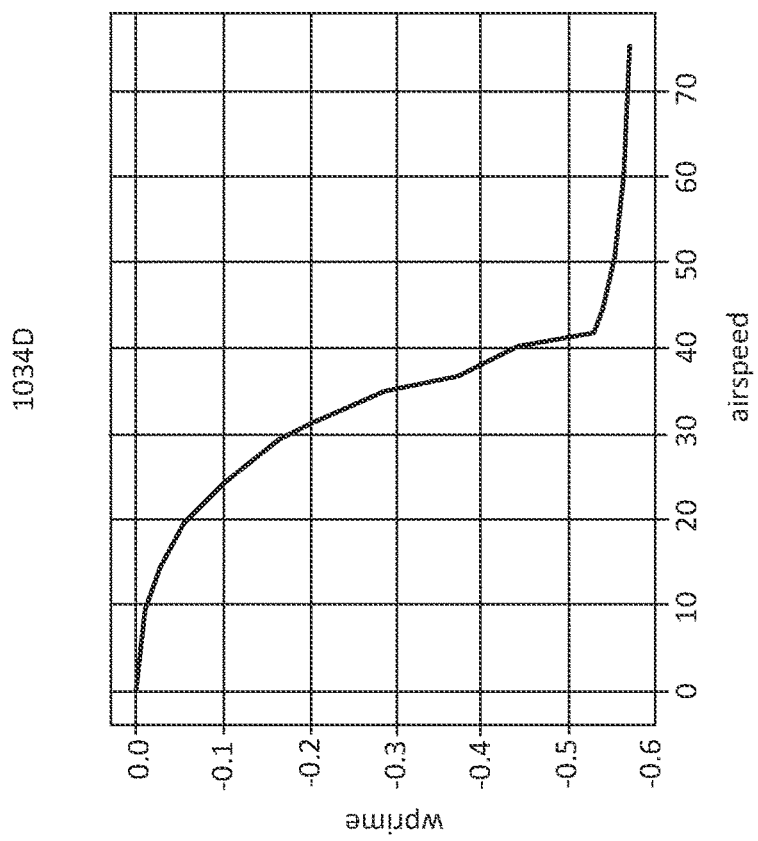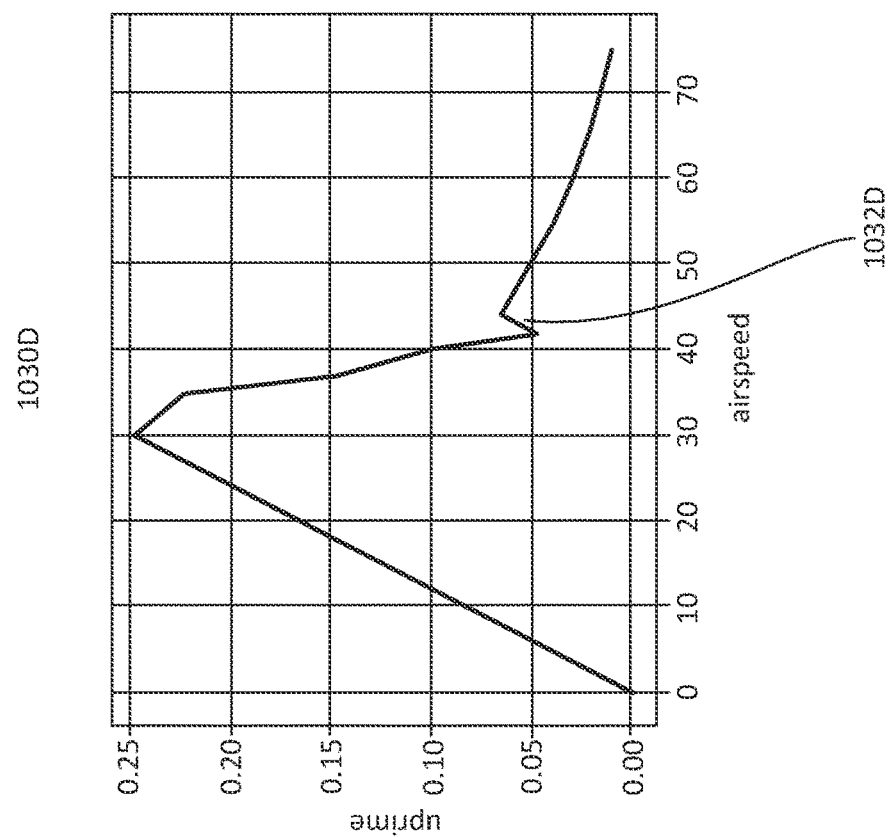
FIG. 10D

SYSTEMS AND METHODS FOR PROPELLER BLADE RETENTION

TECHNICAL FIELD

This disclosure relates generally to the field of powered aerial vehicles. More particularly, and without limitation, the present disclosure relates to innovations in retaining aircraft propeller blades.

SUMMARY

The present disclosure addresses systems, components, and techniques primarily for use in a non-conventional aircraft driven by an electric propulsion system. For example, the aircraft of the present disclosure may be configured for frequent (e.g., over 50 flights per work day), short-duration flights (e.g., less than 100 miles per flight) over, into, and out of densely populated regions. The aircraft may be configured to carry 4-6 passengers or commuters who have an expectation of a comfortable experience with low noise and low vibration. Accordingly, it may be desired that components of the aircraft are configured and designed to withstand frequent use without wearing, generate less heat and vibration, and that the aircraft include mechanisms to effectively control and manage heat or vibration generated by the components. Further, it may be intended that several of these aircraft operate near each other over a crowded metropolitan area. Accordingly, it may be desired that their components are configured and designed to generate low levels of noise interior and exterior to the aircraft, and to have a variety of safety and backup mechanisms. For example, it may be desired for safety reasons that the aircraft be propelled by a distributed propulsion system, avoiding the risk of a single point of failure, and that they are capable of conventional takeoff and landing on a runway. Moreover, it may be desired that the aircraft can safely vertically takeoff and land from and into relatively small or restricted spaces compared to traditional airport runways (e.g., vertiports, parking lots, or driveways) while transporting several passengers or commuters with accompanying baggage. These use requirements may place design constraints on aircraft size, weight, operating efficiency (e.g., drag, energy use), which may impact the design and configuration of the aircraft components.

Disclosed embodiments provide new and improved configurations of aircraft components that are not observed in conventional aircraft, and/or identified design criteria for components that differ from those of conventional aircraft. Such alternate configurations and design criteria, in combination addressing drawbacks and challenges with conventional components, yielded the embodiments disclosed herein for various configurations and designs of components for an aircraft driven by an electric propulsion system.

In some embodiments, the distributed electric propulsion system may include twelve electric engines, which may be mounted on booms forward and aft of the main wings of the aircraft. A subset of the electric engines, such as those mounted forward of the main wings, may be tiltable mid-flight between a horizontally oriented position (e.g., to generate forward thrust for cruising) and a vertically oriented position (e.g., to generate vertical lift for takeoff, landing, and hovering). The propellers of the forward electric engines may rotate in a clockwise or counterclockwise direction. Propellers may counter-rotate with respect to adjacent propellers. The aft electric engines may be fixed in a vertically oriented position (e.g., to generate vertical lift). The propellers may also rotate in a clockwise or counter-clockwise direction. In some embodiments, the difference in rotation direction may be achieved using the direction of engine rotation. In other embodiments, the engines may all rotate in the same direction, and gearing may be used to achieve different propeller rotation directions In some embodiments, an aircraft may possess quantities of electric engines in various combinations of forward and aft engine configurations. For example, an aircraft may possess six forward and six aft electric engines, four forward and four aft electric engines, or any other combination of forward and aft engines, including embodiments where the number of forward electric engines and aft electric engines are not equivalent.

In some embodiments, for a vertical takeoff and landing (VTOL) mission, the forward and aft electric engines may provide vertical thrust during takeoff and landing. During flight phases where the aircraft is moving forward, the forward electric engines may provide horizontal thrust, while the propellers of the aft electric engines may be stowed at a fixed position in order to minimize drag. The aft electric engines may be actively stowed with position monitoring. Transition from vertical flight to horizontal flight and vice-versa may be accomplished via the tilt propeller subsystem. The tilt propeller subsystem may redirect thrust between a primarily vertical direction during vertical flight mode to a horizontal or near-horizontal direction during a forward-flight cruising phase. A variable pitch mechanism may change the forward electric engine's propeller-hub assembly blade collective angles for operation during the hover-phase, transition phase, and cruise-phase.

In some embodiments, in a conventional takeoff and landing (CTOL) mission, the forward electric engines may provide horizontal thrust for wing-borne take-off, cruise, and landing, and the wings may provide vertical lift. In some embodiments, the aft electric engines may not be used for generating thrust during a CTOL mission and the aft propellers may be stowed in place. In other embodiments, the aft electrical engines may be used at reduced power to shorten the length of the CTOL takeoff or landing.

Embodiments of the present disclosure include a propeller blade retention system. Some disclosed embodiments include a hub including a socket formed by an inner surface of the hub. Some disclosed embodiments include a blade extending into the socket. Some disclosed embodiments include a retention sleeve having a first portion and a second portion, the first portion abutting the blade. Some disclosed embodiments include a filler sleeve disposed between the blade and the second portion of the retention sleeve. Some disclosed embodiments include a first bearing disposed between the second portion of the retention sleeve and the inner surface of the hub, the first bearing having a first race contacting the inner surface of the hub. Some disclosed embodiments include a second bearing disposed between the first portion of the retention sleeve and the inner surface of the hub, the second bearing having a second race contacting the inner surface of the hub. Some disclosed embodiments include a cap comprising a body portion disposed between the second portion of the retention sleeve and the inner surface of the hub and a flange portion extending outward from the body portion and away from the blade, the flange portion attachable to an end surface of the hub. Some disclosed embodiments include a shim carrier disposed around the second portion of the retention sleeve, the shim carrier enclosing a shim disposed between the shim carrier and the flange portion of the cap.

In some embodiments, the first bearing includes a needle bearing element. In some embodiments, the second bearing includes an angular contact bearing. Some disclosed embodiments include a ball separator cage disposed between the second race and the first portion of the retention sleeve. Some disclosed embodiments include a first virtual center corresponding to the first bearing and a second virtual center corresponding to the second bearing, wherein the second virtual center is axially inward of the blade. In some embodiments, the blade further comprises an internal portion having a cavity disposed around a reversing ring. In some embodiments, the retention sleeve includes a third race and a fourth race. Some disclosed embodiments include a retaining ring disposed radially outward from the retention sleeve with respect to a blade axis, and axially outward from the shim carrier with respect to the blade axis. Some disclosed embodiments include a blade seal disposed around the retention sleeve and the body portion of the cap. Some disclosed embodiments include a sealing ring disposed between the body portion of the cap and an inner surface of the hub. In some embodiments, a distance between the first virtual center and the second virtual center may be sufficiently large to withstand at least one of centrifugal and bending loads sustained during operation of the system.

Some disclosed embodiments include a system for retaining a propeller for an aircraft. In some embodiments, the propeller includes a retention system. Some disclosed embodiments include a hub including a socket formed by an inner surface of the hub. Some disclosed embodiments include a blade extending into the socket. Some disclosed embodiments include a retention sleeve having a first portion and a second portion, the first portion abutting the blade. Some disclosed embodiments include a filler sleeve disposed between the blade and the second portion of the retention sleeve. Some disclosed embodiments include a first bearing disposed between the second portion of the retention sleeve and the inner surface of the hub, the first bearing having a first race contacting the inner surface of the hub. Some disclosed embodiments include a second bearing disposed between the first portion of the retention sleeve and the inner surface of the hub, the second bearing having a second race contacting the inner surface of the hub, wherein the second race is radially flush with the first race in a radial direction from a blade axis. Some disclosed embodiments include a cap including a body portion disposed between the second portion of the retention sleeve and the inner surface of the hub, wherein the body portion is flush with the first race in the radial direction from the blade axis and a flange portion extending outward from the body portion and away from the blade, the flange portion attachable to an end surface of the hub. Some disclosed embodiments include a shim carrier disposed around the second portion of the retention sleeve, the shim carrier enclosing a shim disposed between the shim carrier and the flange portion of the cap.

In some embodiments, the first bearing includes a needle bearing element. In some embodiments, the second bearing includes an angular contact bearing. Some disclosed embodiments include a ball separator cage disposed between the second bearing and the first portion of the retention sleeve. Some disclosed embodiments include a first virtual center corresponding to the first bearing and a second virtual center corresponding to the second bearing, wherein the second virtual center is axially inward of the blade. In some embodiments, a distance between the first virtual center and the second virtual center may be sufficiently large to withstand at least one of centrifugal and bending loads sustained during operation of the system. In some embodiments, the blade includes an internal portion having a cavity disposed around a reversing ring. In some embodiments, the retention sleeve includes a third race and a fourth race. In some embodiments, the retention sleeve includes an annular rib, wherein the first race and the second race are spaced apart by the annular rib, wherein the annular rib is flush with the first race and the second race in the radial direction. Some disclosed embodiments include a retaining ring disposed radially outward from the retention sleeve with respect to a blade axis, and axially outward from the shim carrier with respect to the blade axis. Some disclosed embodiments include a blade seal disposed around the retention sleeve and the body portion of the cap.

BRIEF DESCRIPTION OF FIGURES

FIG. 10A is an illustration of an exemplary lift electric propulsion systems of a VTOL aircraft, consistent with embodiments of the present disclosure.

FIG. 10B is an illustration of an exemplary lift electric propulsion systems of a VTOL aircraft, consistent with embodiments of the present disclosure.

FIG. 10D is an illustration of graphs of airflow as a function of aircraft speed, consistent with embodiments of the present disclosure.

DETAILED DESCRIPTION

Figure 1:
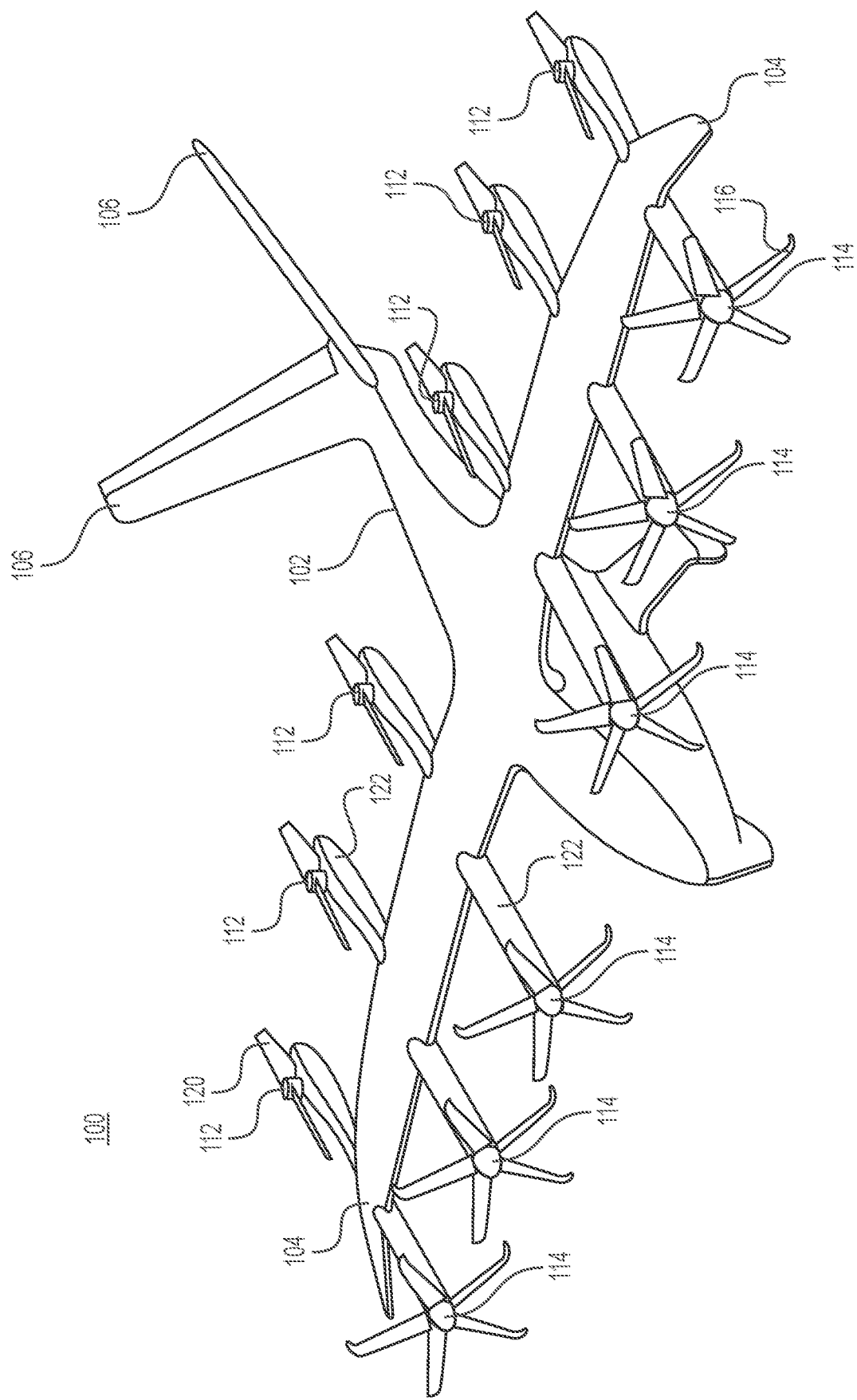
FIG. 1 is an illustration of a perspective view of an exemplary VTOL aircraft, consistent with embodiments of the present disclosure.

The disclosed embodiments provide systems, subsystems, and components for new VTOL aircraft having various combinations of an electric propulsion system and cooling systems that maximize performance while minimizing weight.

In some embodiments, an electric propulsion system as described herein may generate thrust by supplying High Voltage (HV) electric power to an electric engine, which in turn converts HV power into mechanical shaft power which is used to rotate a propeller. An aircraft as described herein may include multiple electric engines mounted forward and aft of the wing. The engines may be mounted directly to the wing, or mounted to one or more booms attached to the wing. The amount of thrust each electric engine generates may be governed by a torque command from a Flight Control System (FCS) over a digital communication interface to each electric engine. Embodiments may include forward electric engines that are capable of altering their orientation, or tilt. Some embodiments include forward engines that may be a clockwise (CW) type or counterclockwise (CCW) type. The forward electric propulsion subsystem may consist of a multi-blade adjustable pitch propeller, as well as a variable pitch subsystem.

In some embodiments, an aircraft may include aft electric engines, or lifters, that can be of a clockwise (CW) type or counterclockwise (CCW) type. Some embodiments may include aft electric engines that utilize a multi-blade fixed pitch propeller.

As described herein, the orientation and use of the electric propulsion system components may change throughout the operation of the aircraft. In some embodiments, during vertical takeoff and landing, the forward propulsion systems as well as aft propulsion systems may provide vertical thrust during takeoff and landing. During the flight phases where the aircraft is in forward flight-mode, the forward propulsion systems may provide horizontal thrust, while the aft propulsion system propellers may be stowed at a fixed position to minimize drag. The aft electric propulsion systems may be actively stowed with position monitoring. Some embodiments may include a transition from vertical flight to horizontal flight and vice-versa. In some embodiments, the transitions may be accomplished via the Tilt Propeller System (TPS). The TPS reorients the electric propulsion system between a primarily vertical direction during vertical flight mode to a mostly horizontal direction during forward-flight mode. Some embodiments may include a variable pitch mechanism that may change the forward propulsion system propeller blade collective angles for operation during the hover-phase, cruise-phase and transition phase. Some embodiments may include a Conventional Takeoff and Landing (CTOL) configurations such that the tilters provide horizontal thrust for wing-borne take-off, cruise and landing phases. In some embodiments, the aft electric engines are not used for generating thrust during a CTOL mission and the aft propellers are stowed in place to minimize drag.

It will be recognized that, VTOL aircraft may involve operations unique to VTOL aircraft rather than general aviation aircraft, including changes in orientation of the propellers and/or engine propulsion systems in cruise, lift, or intermediate operational configurations. Such operations may present challenges for propellers for eVTOL aircraft. For example, propellers may experience various loads, such as centrifugal and bending loads, which may be different than loads experienced in other aircraft. For example, eVTOL propellers may be subject to both axial and non-axial inflow (such as edgewise flow) during in-flight propeller articulation during transitions between hover and cruise configurations, as well as during flight. Some eVTOL propellers may also experience overturning moments (e.g., pitching moments caused by a difference in relative speed between a blade advancing into the air and a blade retreating from the air). Further, VTOL propeller blades may use collective pitch control across a full range of tilt and cruise positions. Therefore, in some embodiments these overturning moments must be addressable without the use of a cyclic pitch system. Thus, it will be recognized that there may be a need for retaining propeller blades for eVTOL aircraft to manage such loads.

Disclosed embodiments include propeller blade retention systems. Disclosed retention systems may include bearing configurations configured to handle the loads experienced by eVTOL propeller blades, while also being structurally efficient. For example, disclosed embodiments may include retention systems which can be lightweight and which can employ bearing assemblies configured at a distance (e.g., spread) between virtual centers of bearing elements to further accommodate loads experienced by VTOL and eVTOL propeller blades. In some examples, disclosed embodiments may involve a bearing system configured to provide support for loads via different bearings (e.g., configurations or combinations of bearings may assist with countering centrifugal and/or bending loads). Some disclosed embodiments include arrangements and configurations which can transmit (e.g., translate) various moments into retention hub moments and thereby into shaft moments. Moreover, disclosed embodiments may involve retention systems providing improved ease of assembly and servicing, including by wear regions which protect the hub of the retention system, thereby also providing improved weight savings and durability. Further, disclosed embodiments may include retention systems which may be compact, which can provide weight savings, easier assembly and/or servicing, and improved drag profiles (e.g., increased fuel efficiency) for aircraft described herein.

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the disclosure. Instead, they are merely examples of apparatuses and methods consistent with aspects related to the subject matter recited in the appended claims.

Exemplary Electric Aircraft Features

Figure 2:
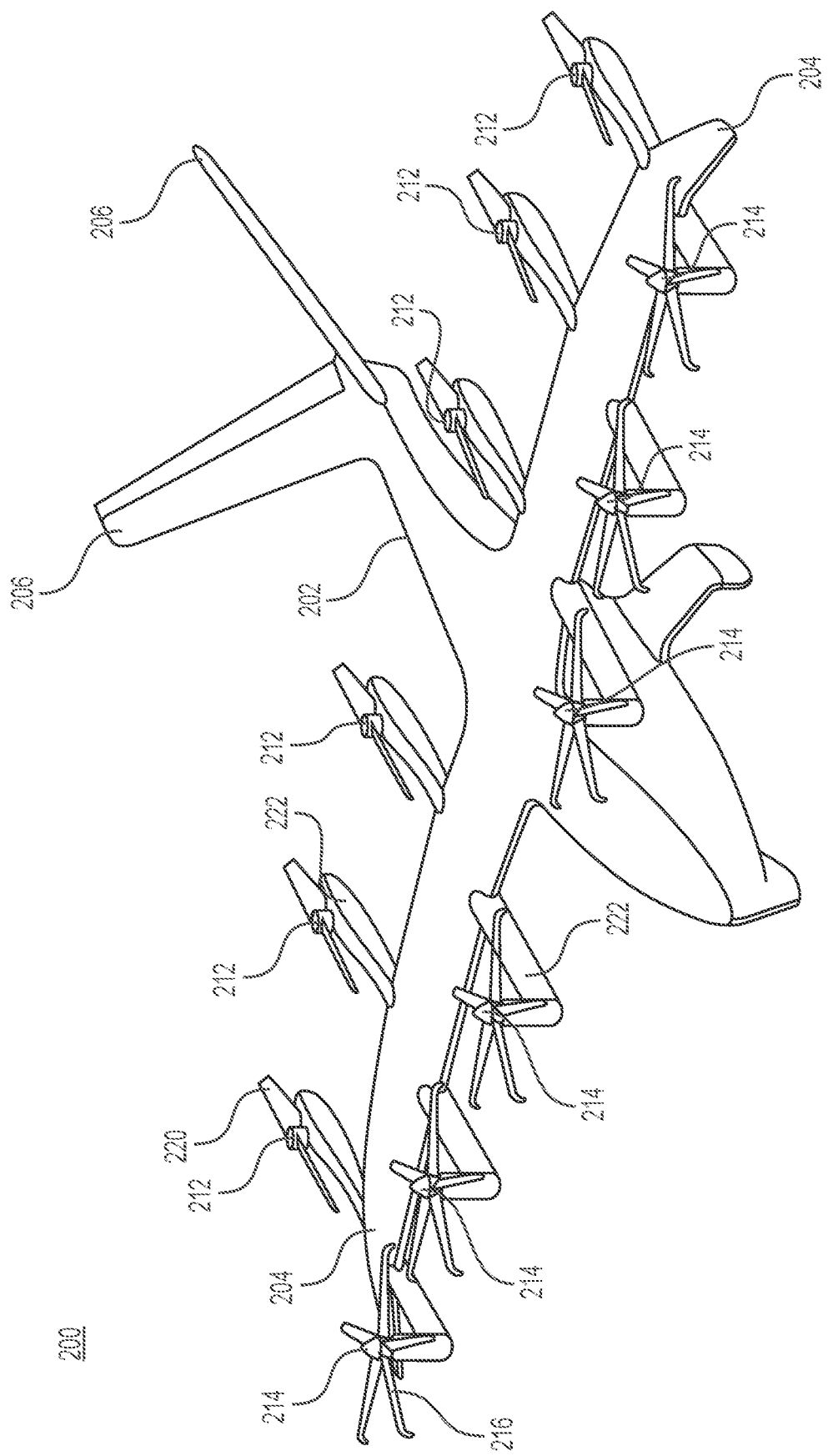
FIG. 2 is another illustration of a perspective view of an exemplary VTOL aircraft in an alternative configuration, consistent with embodiments of the present disclosure.

FIG. 1 is an illustration of a perspective view of an exemplary VTOL aircraft, consistent with disclosed embodiments. FIG. 2 is another illustration of a perspective view of an exemplary VTOL aircraft in an alternative configuration, consistent with embodiments of the present disclosure. FIGS. 1 and 2 illustrate a VTOL aircraft 100, 200 in a cruise configuration and a vertical take-off, landing and hover configuration (also referred to herein as a "lift" configuration), respectively, consistent with embodiments of the present disclosure. Elements corresponding to FIGS. 1 and 2 may possess like numerals and refer to similar elements of the aircrafts 100, 200. The aircraft 100, 200 may include a fuselage 102, 202, wings 104, 204 mounted to the fuselage 102, 202 and one or more rear stabilizers 106, 206 mounted to the rear of the fuselage 102, 202. A plurality of lift propellers 112, 212 may be mounted to wings 104, 204 and may be configured to provide lift for vertical take-off, landing and hover. A plurality of tilt propellers 114, 214 may be mounted to wings 104, 204 and may be tiltable between the lift configuration in which they provide a portion of the lift required for vertical take-off, landing and hovering, as shown in FIG. 2, and the cruise configuration in which they provide forward thrust to aircraft 100 for horizontal flight, as shown in FIG. 1. As used herein, a tilt propeller lift configuration refers to any tilt propeller orientation in which the tilt propeller thrust is providing primarily lift to the aircraft and tilt propeller cruise configuration refers to any tilt propeller orientation in which the tilt propeller thrust is providing primarily forward thrust to the aircraft.

In some embodiments, lift propellers 112, 212 may be configured for providing lift only, with all horizontal propulsion being provided by the tilt propellers. Accordingly, lift propellers 112, 212 may be configured with fixed positions and may only generate thrust during take-off, landing and hover phases of flight. Meanwhile, tilt propellers 114, 214 may be tilted upward into a lift configuration in which thrust from propellers 114, 214 is directed downward to provide additional lift.

For forward flight, tilt propellers 114, 214 may tilt from their lift configurations to their cruise configurations. In other words, the orientation of tilt propellers 114, 214 may be varied from an orientation in which the tilt propeller thrust is directed downward (to provide lift during vertical take-off, landing and hover) to an orientation in which the tilt propeller thrust is directed rearward (to provide forward thrust to aircraft 100, 200). The tilt propellers assembly for a particular electric engine may tilt about an axis of rotation defined by a mounting point connecting the boom and the electric engine. When the aircraft 100, 200 is in full forward flight, lift may be provided entirely by wings 104, 204. Meanwhile, in the cruise configuration, lift propellers 112, 212 may be shut off. The blades 120, 220 of lift propellers 112, 212 may be held in low-drag positions for aircraft cruising. In some embodiments, lift propellers 112, 212 may each have two blades 120, 220 extending from a center hub that may be locked for cruising in minimum drag positions in which one blade is directly in front of the other blade as illustrated in FIG. 1. In some embodiments, lift propellers 112, 212 have more than two blades. In some embodiments, tilt propellers 114, 214 may include more blades 116, 216 than lift propellers 112, 212. For example, as illustrated in FIGS. 1 and 2, lift propellers 112, 212 may each include, e.g., two blades, whereas and tilt propellers 114, 214 may each include more blades, such as the five blades shown. In some embodiments, each of the tilt propellers 114, 214 may have 2 to 5 blades, and possibly more depending on the design considerations and requirements of the aircraft.

In some embodiments, the aircraft may include a single wing 104, 204 on each side of fuselage 102, 202 (or a single wing that extends across the entire aircraft). At least a portion of lift propellers 112, 212 may be located rearward of wings 104, 204 and at least a portion of tilt propellers 114, 214 may be located forward of wings 104, 204. In some embodiments, all of lift propellers 112, 212 may be located rearward of wings 104, 204 and all of tilt propellers 114, 214 may be located forward of wings 104, 204. According to some embodiments, all lift propellers 112, 212 and tilt propellers 114, 214 may be mounted to the wings—i.e., no lift propellers or tilt propellers may be mounted to the fuselage. In some embodiments, lift propellers 112, 212 may be all located rearwardly of wings 104, 204 and tilt propellers 114, 214 may be all located forward of wings 104, 204. According to some embodiments, all lift propellers 112, 212 and tilt propellers 114, 214 may be positioned inwardly of the ends of the wing 104, 204.

In some embodiments, lift propellers 112, 212 and tilt propellers 114, 214 may be mounted to wings 104, 204 by booms 122, 222. Booms 122, 222 may be mounted beneath wings 104, 204, on top of the wings, and/or may be integrated into the wing profile. In some embodiments, lift propellers 112, 212 and tilt propellers 114, 214 may be mounted directly to wings 104, 204. In some embodiments, one lift propeller 112, 212 and one tilt propeller 114, 214 may be mounted to each boom 122, 222. Lift propeller 112, 212 may be mounted at a rear end of boom 122, 222 and tilt propeller 114, 214 may be mounted at a front end of boom 122, 222. In some embodiments, lift propeller 112, 212 may be mounted in a fixed position on boom 122, 222. In some embodiments, tilt propeller 114, 214 may mounted to a front end of boom 122, 222 via a hinge. Tilt propeller 114, 214 may be mounted to boom 122, 222 such that tilt propeller 114, 214 is aligned with the body of boom 122, 222 when in its cruise configuration, forming a continuous extension of the front end of boom 122, 222 that minimizes drag for forward flight.

In some embodiments, aircraft 100, 200 may include, e.g., one wing on each side of fuselage 102, 202 or a single wing that extends across the aircraft. According to some embodiments, the at least one wing 104, 204 is a high wing mounted to an upper side of fuselage 102, 202. According to some embodiments, the wings include control surfaces, such as flaps and/or ailerons. According to some embodiments, wings 104, 204 may have designed with a profile that reduces drag during forward flight. In some embodiments, the wing tip profile may be curved and/or tapered to minimize drag.

In some embodiments, rear stabilizers 106, 206 include control surfaces, such as one or more rudders, one or more elevators, and/or one or more combined rudder-elevators. The wing(s) may have any suitable design. In some embodiments, the wings have a tapering leading edge.

In some embodiments, lift propellers 112, 212 or tilt propellers 114, 214 may canted relative to at least one other lift propeller 112, 212 or tilt propeller 114, 214. As used herein, canting refers to a relative orientation of the rotational axis of the lift propeller/tilt propeller about a line that is parallel to the forward-rearward direction, analogous to the roll degree of freedom of the aircraft. Canting of the lift propellers and/or tilt propellers may help minimize damage from propeller burst by orienting a rotational plane of the lift propeller/tilt propeller discs (the blades plus the hub onto which the blades are mounted) so as to not intersect critical portions of the aircraft (such areas of the fuselage in which people may be positioned, critical flight control systems, batteries, adjacent propellers, etc.) or other propeller discs and may provide enhanced yaw control during flight.

Figure 3:
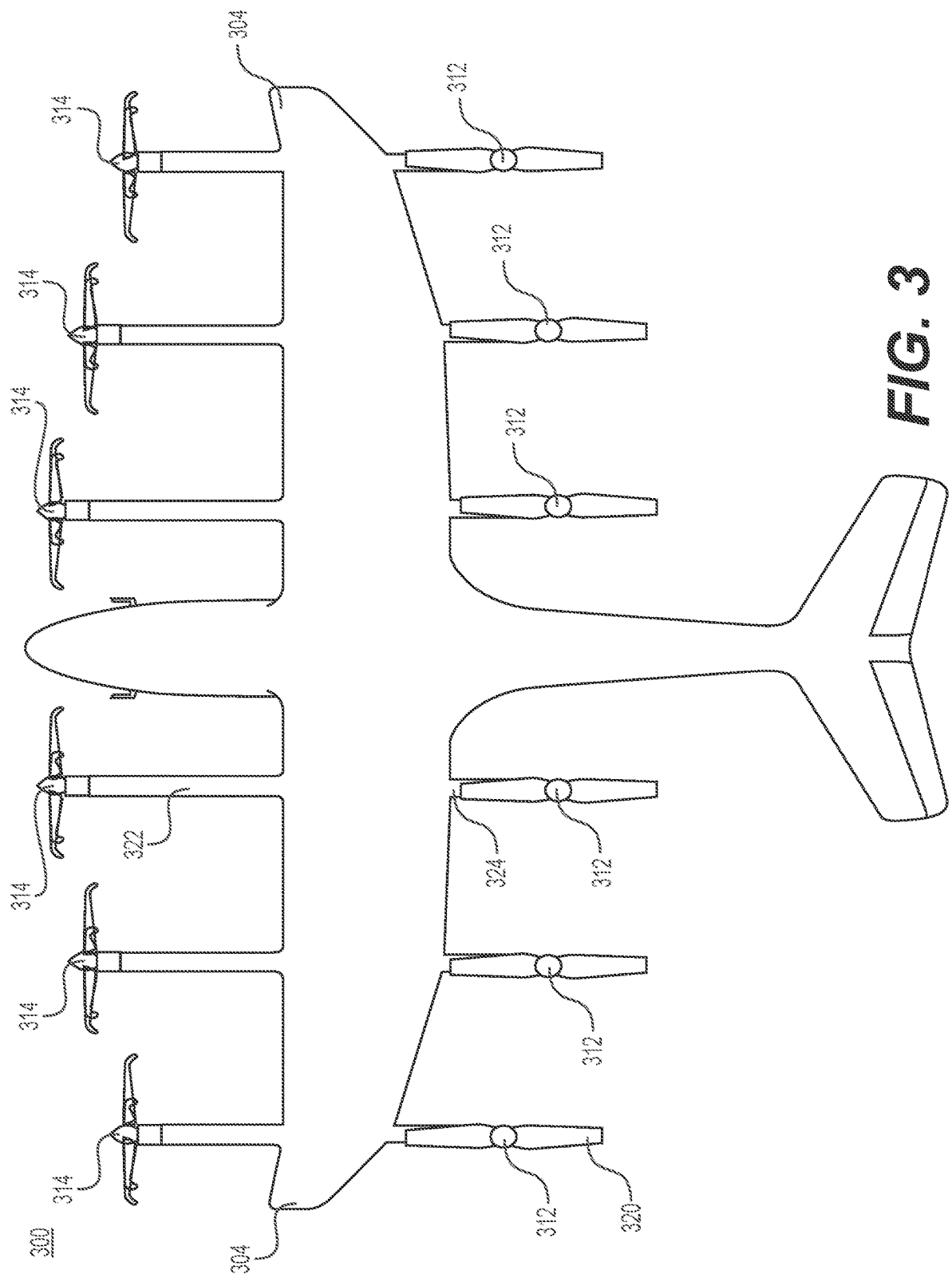
FIG. 3 is an illustration of a top plan view of an exemplary VTOL aircraft, consistent with embodiments of the present disclosure.

FIG. 3 is an illustration of a top plan view of an exemplary VTOL aircraft, consistent with embodiments of the present disclosure. Aircraft 300 shown in the figure may be a top plan view of the aircraft 100, 200 shown in FIGS. 1 and 2, respectively. As discussed herein, an aircraft 300 may include twelve electric propulsion systems distributed across the aircraft 300. In some embodiments, a distribution of electric propulsion systems may include six forward electric propulsion systems 314 and six aft electric propulsion systems 312 mounted on booms forward and aft of the main wings 304 of the aircraft 300. In some embodiments, a length of the rear end of the boom 324 from the wing 304 to the lift propeller 312 may comprise a similar rear end of the boom 324 length across the numerous rear ends of the booms. In some embodiments, the length of the rear ends of the booms may vary across the, exemplary, six rear ends of the booms. For example, each rear end of the boom 324 may comprise a different length from the wing 304 to the lift propeller 312, or a subset of rear ends of booms may be similar in length. In some embodiments, a front end of boom 322 may comprise various lengths from the wing 304 to the tilt propeller 314 across the front ends of booms. For example, as shown in FIG. 3, a length of the front end of boom 322 from the tilt propellers 314 nearest the fuselage to the wing 304 may comprise a greater length than the length of the front end of the boom 322 from the wing 304 to the tilt propellers 314 furthest from the fuselage. Some embodiments may include front ends of the booms with similar lengths across the, exemplary, six front ends of booms or any other distribution of lengths of the front ends of booms from the wing 304 to tilt propellers 314. Some embodiments may include an aircraft 300 possessing eight electric propulsion systems with four forward electric propulsion systems 314 and four aft electric propulsion systems 312, or any other distribution of forward and aft electric propulsion systems, including embodiments where the number of forward electric propulsion systems 314 is less than or greater than the number of aft electric propulsion systems 312. Further, FIG. 3 depicts an exemplary embodiment of a VTOL aircraft 300 with forward propellers 314 in a horizontal orientation for horizontal flight and aft propeller blades 320 in a stowed position for a forward phase of flight.

As disclosed herein, the forward electric propulsion systems and aft electric propulsion systems may be of a clockwise (CW) type or counterclockwise (CCW) type. Some embodiments may include various forward electric propulsion systems possessing a mixture of both CW and CCW types. In some embodiments, the aft electric propulsion systems may possess a mixture of CW and CCW type systems among the aft electric propulsion systems.

Figure 4:
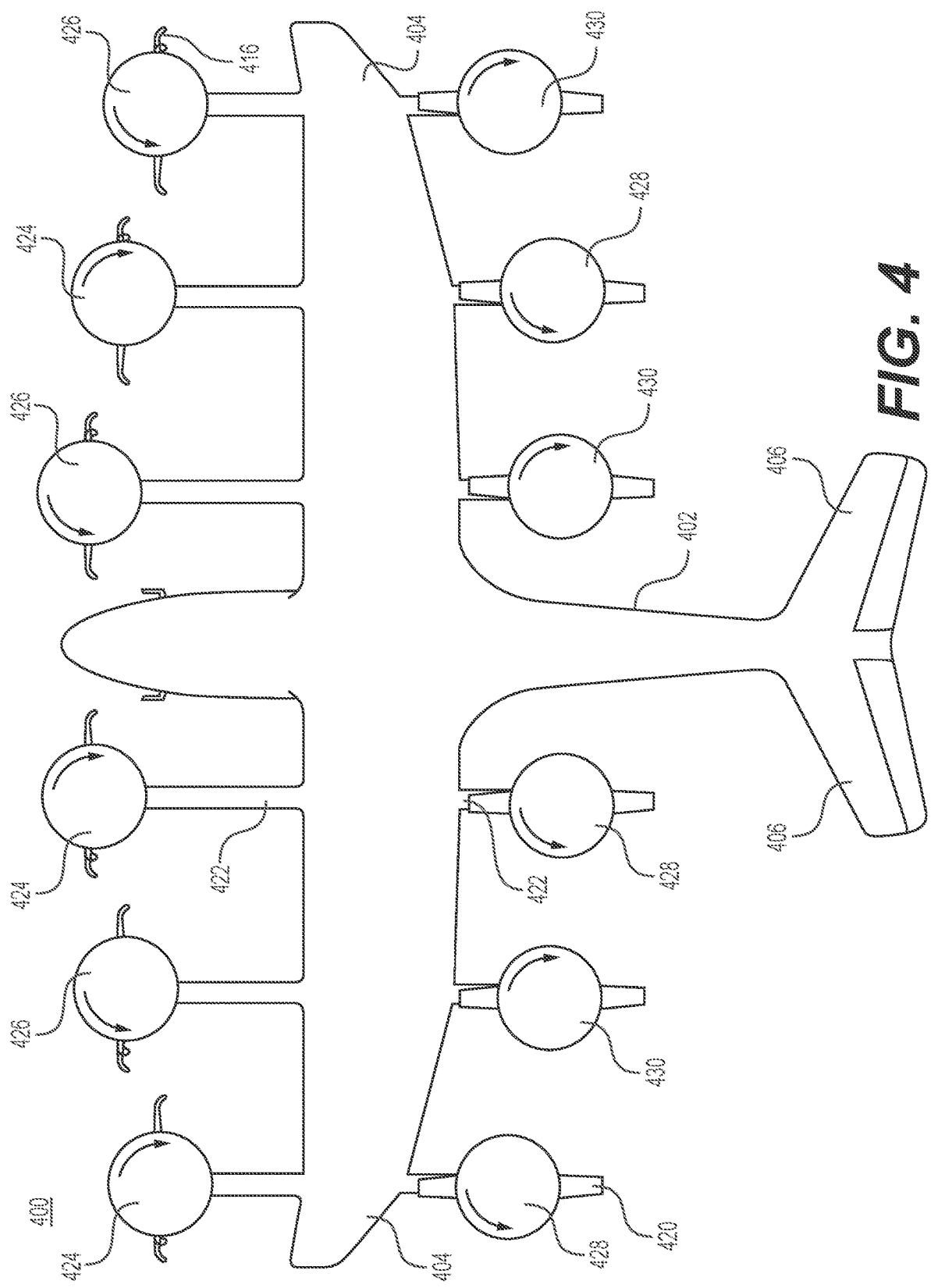
FIG. 4 is a schematic diagram illustrating exemplary propeller rotation of a VTOL aircraft, consistent with embodiments of the present disclosure.

FIG. 4 is a schematic diagram illustrating exemplary propeller rotation of a VTOL aircraft, consistent with disclosed embodiments. Aircraft 400 shown in the figure may be a top plan view of the aircraft 100, 200, and 300 shown in FIGS. 1, 2, and 3, respectively. An aircraft 400 may include six forward electric propulsion systems with three of the forward electric propulsion systems being of CW type 424 and the remaining three forward electric propulsion systems being of CCW type 426. In some embodiments, three aft electric propulsion systems may be of CCW type 428 with the remaining three aft electric propulsion systems being of CW type 430. Some embodiments may include an aircraft 400 possessing four forward electric propulsion systems and four aft electric propulsion systems, each with two CW types and two CCW types. In some embodiments, propellers may counter-rotate with respect to adjacent propellers to cancel torque steer, generated by the rotation of the propellers, experienced by the fuselage or wings of the aircraft. In some embodiments, the difference in rotation direction may be achieved using the direction of engine rotation. In other embodiments, the engines may all rotate in the same direction, and gearing may be used to achieve different propeller rotation directions.

Some embodiments may include an aircraft 400 possessing forward and aft electric propulsion systems where the amount of CW types 424 and CCW types 426 is not equal among the forward electric propulsion systems, among the aft electric propulsion systems, or among the forward and aft electric propulsion systems.

Figure 5:
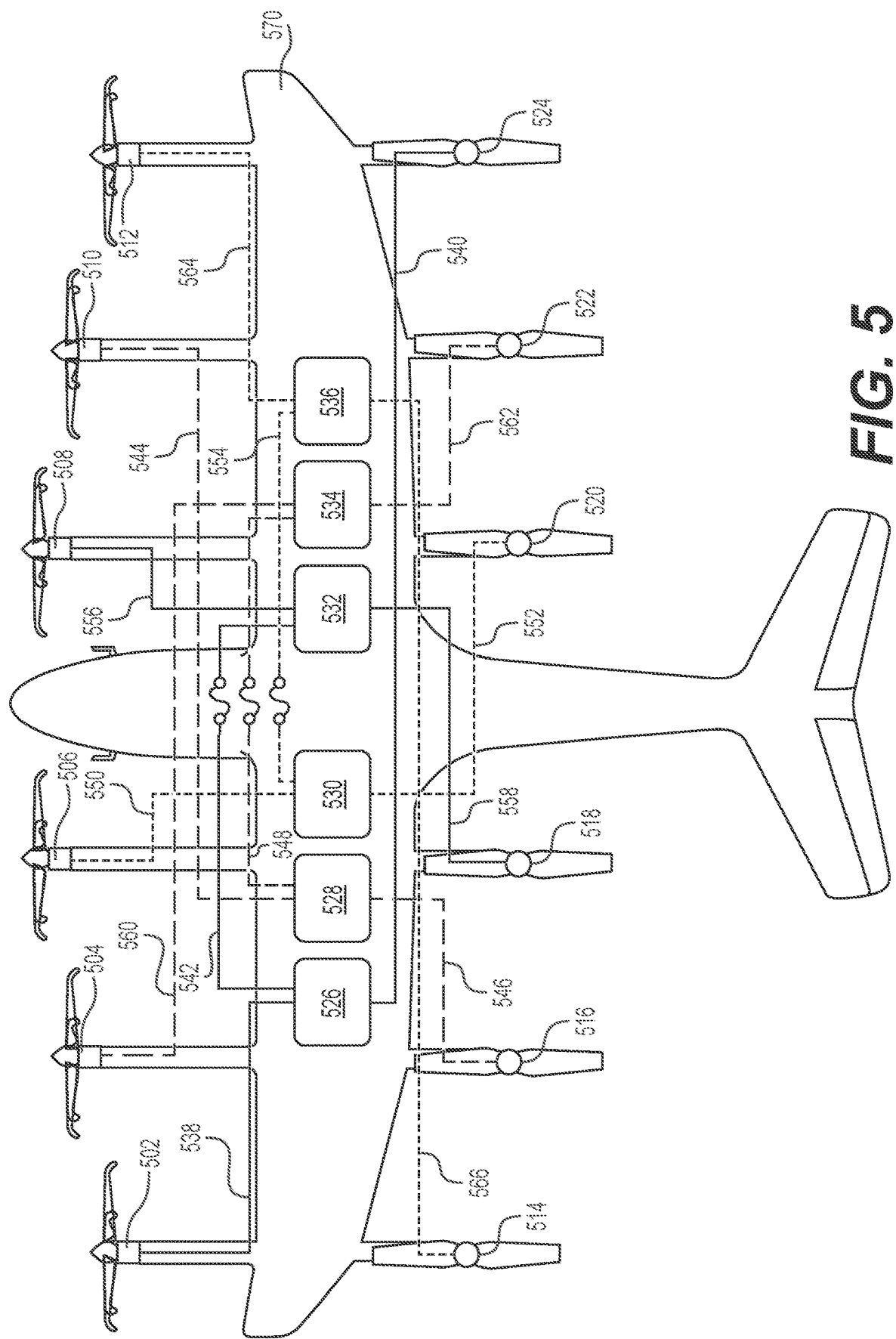
FIG. 5 is a schematic diagram illustrating exemplary power connections in a VTOL aircraft, consistent with embodiments of the present disclosure.

FIG. 5 is a schematic diagram illustrating exemplary power connections in a VTOL aircraft, consistent with disclosed embodiments. A VTOL aircraft may have various power systems connected to diagonally opposing electric propulsion systems. In some embodiments, the power systems may include high voltage power systems. Some embodiments may include high voltage power systems connected to electric engines via high voltage channels. In some embodiments, an aircraft 500 may include six power systems, including batteries 526, 528, 530, 532, 534, and 536 stored within the wing 570 of the aircraft 500. In some embodiments, the aircraft 500 may include six forward electric propulsion systems having six electric engines 502, 504, 506, 508, 510, and 512 and six aft electric propulsion systems having six electric engines 514, 516, 518, 520, 522, and 524. In some embodiments, a battery may be connected to diagonally opposing electric engines. In such a configuration, first power system 526 may provide power to electric engines 502 via power connection channel 538 and electric engine 524 via power connection channel 540. In some embodiments, first power system 526 may also be paired with a fourth power system 532 via a power connection channel 542 possessing a fuse to prevent excessive current from flowing through the power systems 526 and 532. Further to this embodiment, VTOL aircraft 500 may include a second power system 528 paired with a fifth power system 534 via power connection channel 548 possessing a fuse and may provide power to electric engines 510 and 516 via power connection channels 544 and 546, respectively. In some embodiments, a third power system 530 may be paired with a sixth power system 536 via power connection channel 554 possessing a fuse and may provide power to electric engines 506 and 520 via power connection channels 550 and 552, respectively. The fourth power system 532 may also provide power to electric engines 508 and 518 via power connection channels 556 and 558, respectively. The fifth power system 534 may also provide power to electric engines 504 and 522 via power connection channels 560 and 562, respectively. The sixth power system 536 may also provide power to electric engines 512 and 514 via power connection channels 564 and 566, respectively.

Figure 6:
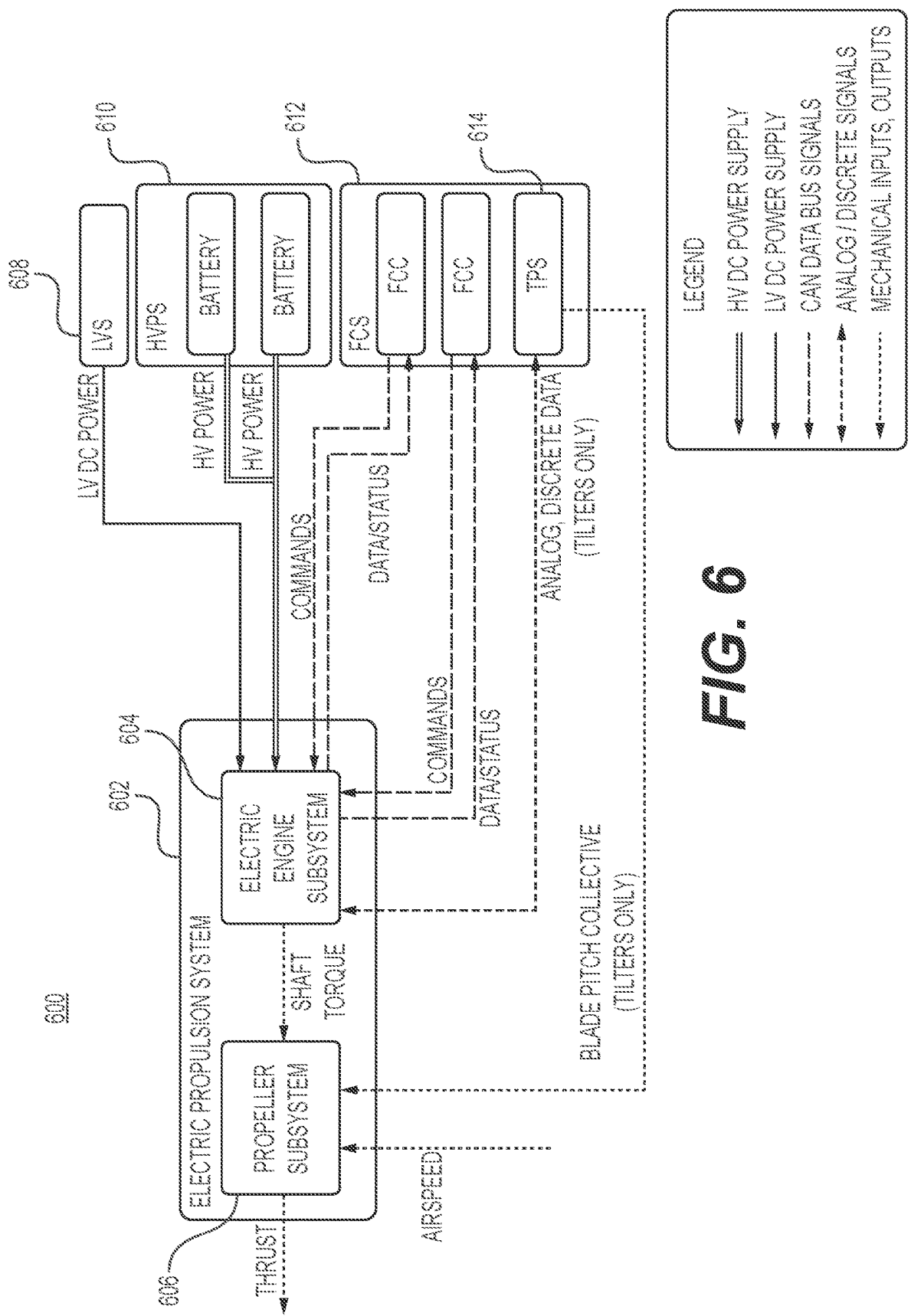
FIG. 6 is a block diagram illustrating an exemplary architecture and design of an electric propulsion unit of a VTOL aircraft, consistent with embodiments of the present disclosure.

FIG. 6 illustrates block diagram of an exemplary architecture and design of an electric propulsion unit 600 consistent with disclosed embodiments. In some embodiments, an electric propulsion system 602 may include an electric engine subsystem 604 that may supply torque, via a shaft, to a propeller subsystem 606 to produce the thrust of the electric propulsion system 602. Some embodiments may include the electric engine subsystem 604 receiving low voltage DC (LV DC) power from a Low Voltage System (LVS) 608. Some embodiments may include the electric engine subsystem 604 receiving high voltage (HV) power from a High Voltage Power System (HVPS) 610 comprising at least one battery or other device capable of storing energy. In some embodiments, a High Voltage Power System may include more than one battery, or other device capable of storing energy, supplying high voltage power to the electric engine subsystem 604. It is recognized that such a configuration may be advantageous as to not risk a single point of failure where a single battery failure leads to an electric propulsion system 602 failure.

Some embodiments may include an electric propulsion system 602 including an electric engine subsystem 604 receiving signals from and sending signals to a flight control system 612. In some embodiments, a flight control system 612 may comprise a flight control computer capable of using Controller Area Network ("CAN") data bus signals to send commands to the electric engine subsystem 604 and receive status and data from the electric engine subsystem 604. It should be understood that while CAN data bus signals are used between the flight control computer and the electric engine(s), some embodiments may include any form of communication with the ability to send and receive data from a flight control computer to an electric engine. In some embodiments, a flight control system 612 may also include a Tilt Propeller System ("TPS") 614 capable of sending and receiving analog, discrete data to and from the electric engine subsystem 604 of the tilt propellers. A tilt propeller system 614 may include an apparatus capable of communicating operating parameters to an electric engine subsystem 604 and articulating an orientation of the propeller subsystem 606 to redirect the thrust of the tilt propellers during various phases of flight using mechanical means such as a gearbox assembly, linear actuators, and any other configuration of components to alter an orientation of the propeller subsystem 606.

As discussed throughout, an exemplary VTOL aircraft may possess various types of electric propulsion systems including tilt propellers and lift propellers, including forward electric engines with the ability to tilt during various phases of flight, and aft electric engines that remain in one orientation and may only be active during certain phases of flight (i.e., take off, landing, and hover).

Figure 7:
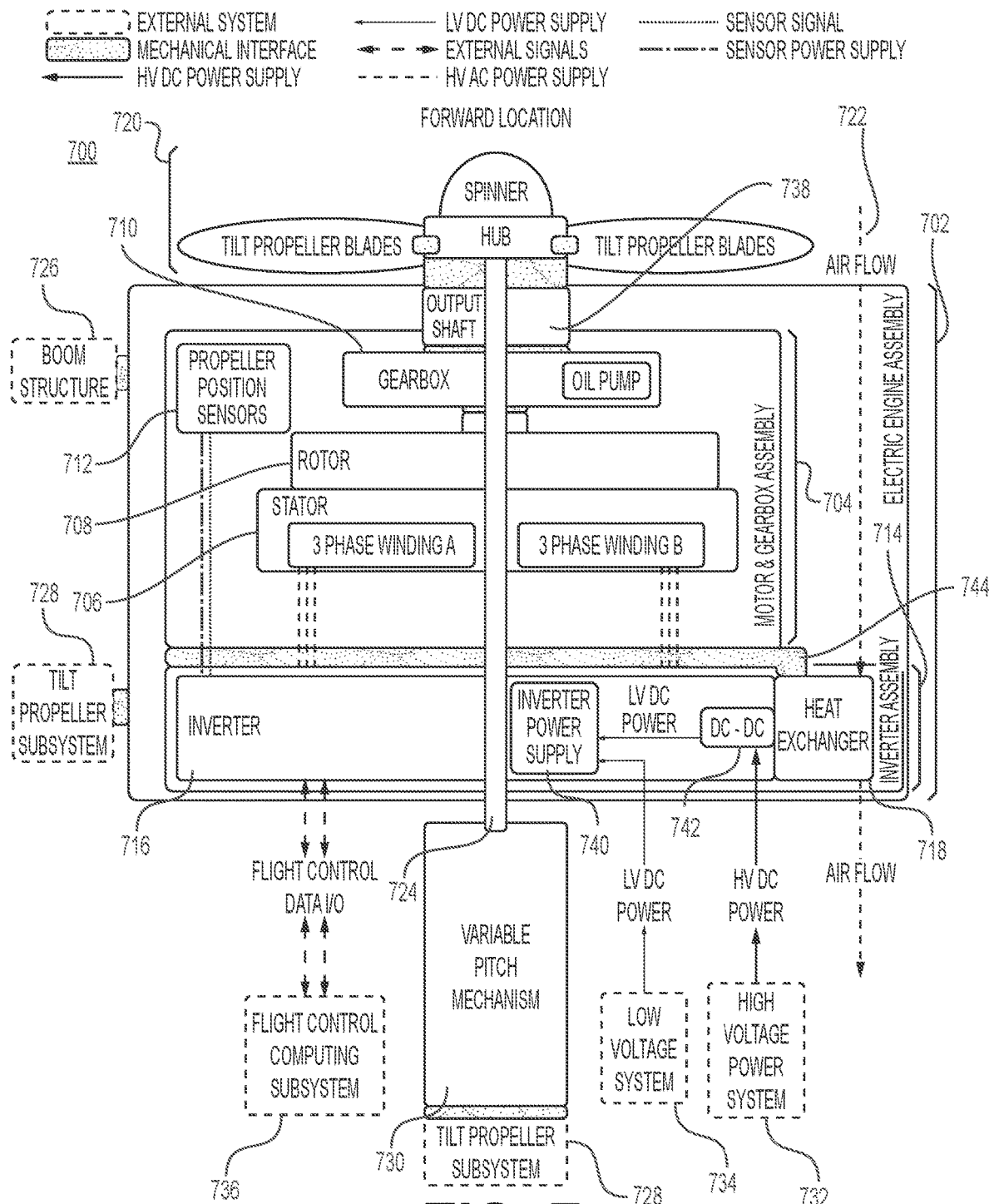
FIG. 7 is a schematic diagram illustrating an exemplary tilt electric propulsion system of a VTOL aircraft, consistent with embodiments of the present disclosure.

FIG. 7 is a schematic diagram illustrating an exemplary tilt electric propulsion system of a VTOL aircraft, consistent with disclosed embodiments. A tiltable electric propulsion system 700 may include an electric engine assembly 702 aligned along a shaft 724 that is connected to an output shaft 738 that is mechanically coupled to a propeller assembly 720 comprising a hub, a spinner, and tilt propeller blades. In some embodiments, an electric engine assembly 702 may include a motor and gearbox assembly 704 aligned along and mechanically coupled to the shaft 724. In some embodiments, a motor and gearbox assembly 704 may include an electric motor assembly comprising a stator 706 and a rotor 708. As shown in FIG. 7, and present in some embodiments, a stator 706 may include multiple stator windings connected to the inverter 716. In such a configuration, a stator 706 may incorporate one or more redundancies so that, in the event one set of windings were to fail, power would still be transmitted to the stator 706 via one or more remaining windings, so that the electric engine assembly 702 retains power and continues to generate thrust at the propeller assembly 720.

In some embodiments, a motor and gearbox assembly 704 may contain a gearbox 710 aligned along the shaft 724 to provide a gear reduction between the torque of the shaft 724 from the electric engine assembly, comprising a stator 706 and rotor 708, and the output shaft 738 Torque applied to the output shaft 738 may be transferred to the propeller assembly 720. Some embodiments may include a gearbox 710 containing an oil pump. In such an embodiment, the oil pump may drive a circulation of oil throughout the motor and gearbox assembly 704 at a speed equivalent to the rotation of the output shaft 738 to cool and lubricate the gearbox and electric motor components. In some embodiments, the oil pump may drive a circulation of oil at a speed greater than or less than the rotation of the output shaft 738. Some embodiments of a motor and gearbox assembly 704 may include propeller position sensors 712 present within the housing that may detect a magnetic field produced by the electric engine assembly to determine a propeller position. Further embodiments may include propeller position sensors 712 that are powered by an inverter 716 and send collected data to an inverter 716.

In some embodiments, an electric engine assembly 702 may also include an inverter assembly 714 aligned along the shaft 724. An inverter assembly 714 may include an inverter 716 and an inverter power supply 740 An inverter power supply 740 may accept low voltage DC power from a low voltage system 734 located outside the electric engine assembly 702. An inverter power supply 740 may accept low voltage DC power originating from a high voltage power system 732, located outside the electric engine assembly 702, that has been converted to low voltage DC power via a DC-DC converter 742. An inverter 716 may supply high voltage alternating current to the stator 706 of the electric engine assembly located within the motor and gearbox assembly 704 via at least one three-phase winding. An inverter assembly 714 may include an inverter 716 that may receive flight control data from a flight control computing subsystem 736.

In some embodiments, a motor and gearbox 704 may be located between an inverter assembly 714 and a propeller assembly 720. Some embodiments may also include a divider plate 744 coupled to the motor and gearbox assembly 704 and inverter assembly 714. A divider plate 744 may create an enclosed environment for an upper portion of the motor and gearbox assembly 704 via an end bell assembly, and create an enclosed environment for a lower portion of the inverter assembly 714 via a thermal plate. In some embodiments, divider plate 744 may serve as an integral mounting bracket for supporting heat exchanger 718. Heat exchanger 718 may comprise, for example, a folded fin or other type of heat exchanger. In some embodiments, the electric propulsion system 700 may circulate oil or other coolant throughout the electric engine assembly 702, motor and gearbox assembly 704, or inverter assembly 714 to transfer heat generated from the components to the oil or other coolant liquid. The heated oil or other coolant liquid may circulate through heat exchanger 718 to transfer the heat to an air flow 722 passing through the fins of the heat exchanger.

In some embodiments, the electric engine assembly 702 may be mounted or coupled to a boom structure 726 of the aircraft. A variable pitch mechanism 730 may be mechanically coupled to the propeller assembly 720. In some embodiments, the variable pitch mechanism may abut the electric engine assembly 702. In some embodiments, the variable pitch mechanism 730 may be coupled to the variable pitch mechanism 730 such it may be remotely mounted within the boom, wing, or fuselage of the aircraft. In some embodiments, the variable pitch mechanism 730 may include a shaft or component traveling within or adjacent to the shaft 724 to the propeller assembly 720. A variable pitch mechanism 730 may serve to change the collective angle of the forward electric engine's propeller assembly blades as needed for operation during the hover-phase, transition phase, and cruise-phase. Some embodiments may include the electric engine assembly 702 being mechanically coupled to a tilt propeller subsystem 728 that may redirect thrust between a primarily vertical direction during vertical flight mode to a mostly horizontal direction during forward-flight mode. In some embodiments, the tilt propeller subsystem may abut the variable pitch mechanism 730. Some embodiments may include a tilt propeller subsystem 728 comprising various components located in various locations. For example, a component of the tilt propeller subsystem may be coupled to the electric engine assembly 702 and other components may be coupled to the variable pitch mechanism 730. These various components of the tilt propeller subsystem 728 may work together to redirect the thrust of the tiltable electric propulsion system 700.

Figure 8:
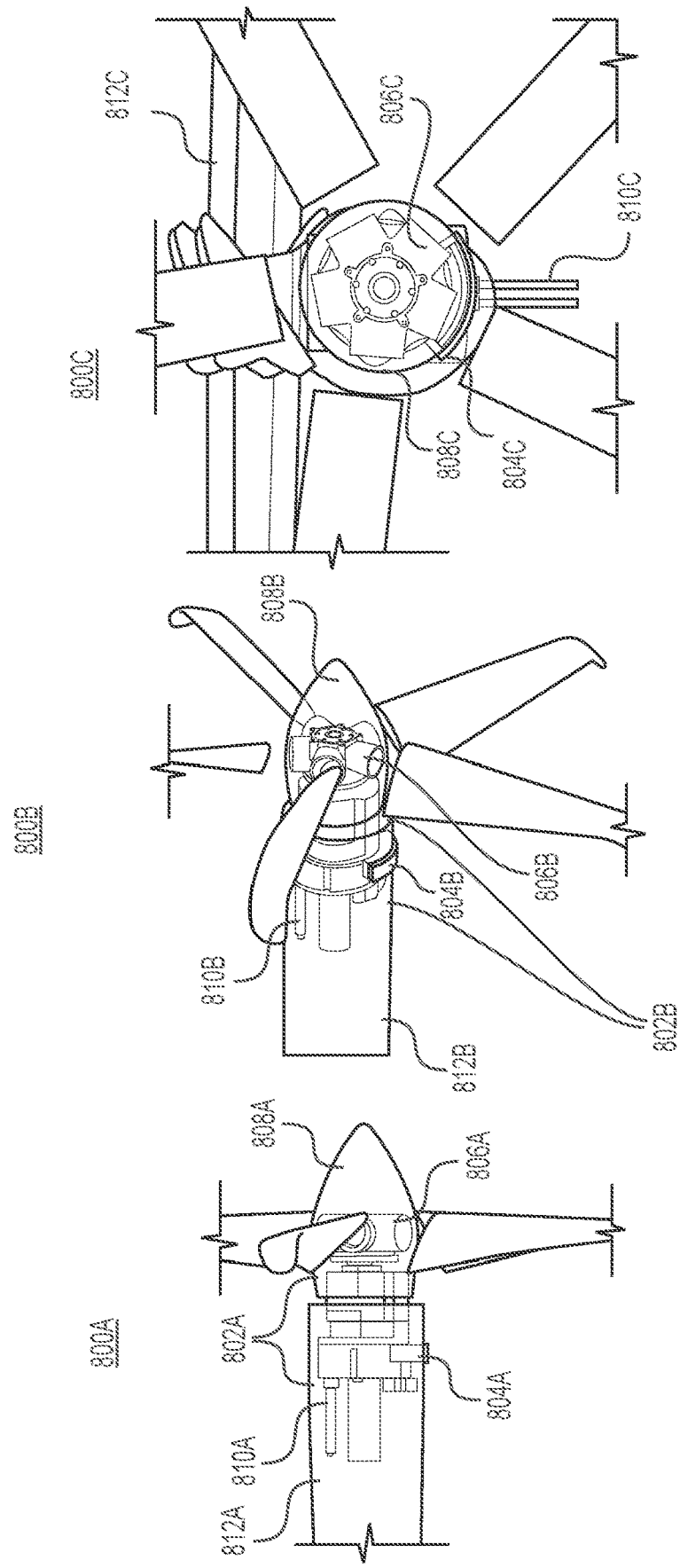
FIGS. 8A-8C are illustrations of an exemplary tilt electric propulsion system of a VTOL aircraft, consistent with embodiments of the present disclosure.

FIGS. 8A-8C are illustrations of an exemplary tilt electric propulsion system of a VTOL aircraft, consistent with disclosed embodiments. FIGS. 8A-C possess like numerals and refer to similar elements of tiltable electric propulsion systems 800A, 800B, and 800C. As such, similar design considerations and configurations may be considered throughout the embodiments FIGS. 8A and 8B illustrate a side profile and perspective view, respectively, of a tiltable electric propulsion system 800A, 800B in a cruise configuration integrated into a boom 812A, 812B consistent with this disclosure. A tiltable propeller electric propulsion system 800A, 800B may comprise an electric engine assembly 802A, 802B housed within a boom 812A, 812B of a VTOL aircraft. In some embodiments, a cruise configuration may include the electric engine assembly 802A, 802B being posited within the boom 812A, 812B. An electric engine assembly 802A, 802B may comprise an electric motor assembly, a gearbox assembly, an inverter assembly with power connection channels 810A, 810B, and a heat exchanger 804A, 804B, as described herein. The electric engine assembly 802A, 802B may be mechanically coupled to a propulsion assembly 808A, 808B comprising a shaft flange assembly 806A, 806B, a spinner, and propeller blades.

FIG. 8C illustrates a top-down view, along a spinner 808C, of a tiltable electric propulsion system 800C in a lift configuration integrated into a boom 812B consistent with this disclosure. As shown in FIG. 8C a tiltable electric propulsion system 800C in a lift configuration may comprise the electric engine assembly 802A, 802B being posited outside of the boom 812C and changing its orientation with respect to the boom 812C. In some examples, tiltable electric propulsion system 800C may include a propeller blade retention system 806C.

As discussed herein, a lift electric propulsion system may be configured to provide thrust in one direction and may not provide thrust during all phases of flight. For example, a lift system may provide thrust during take-off, landing, and hover, but may not provide thrust during cruise.

Figure 9:
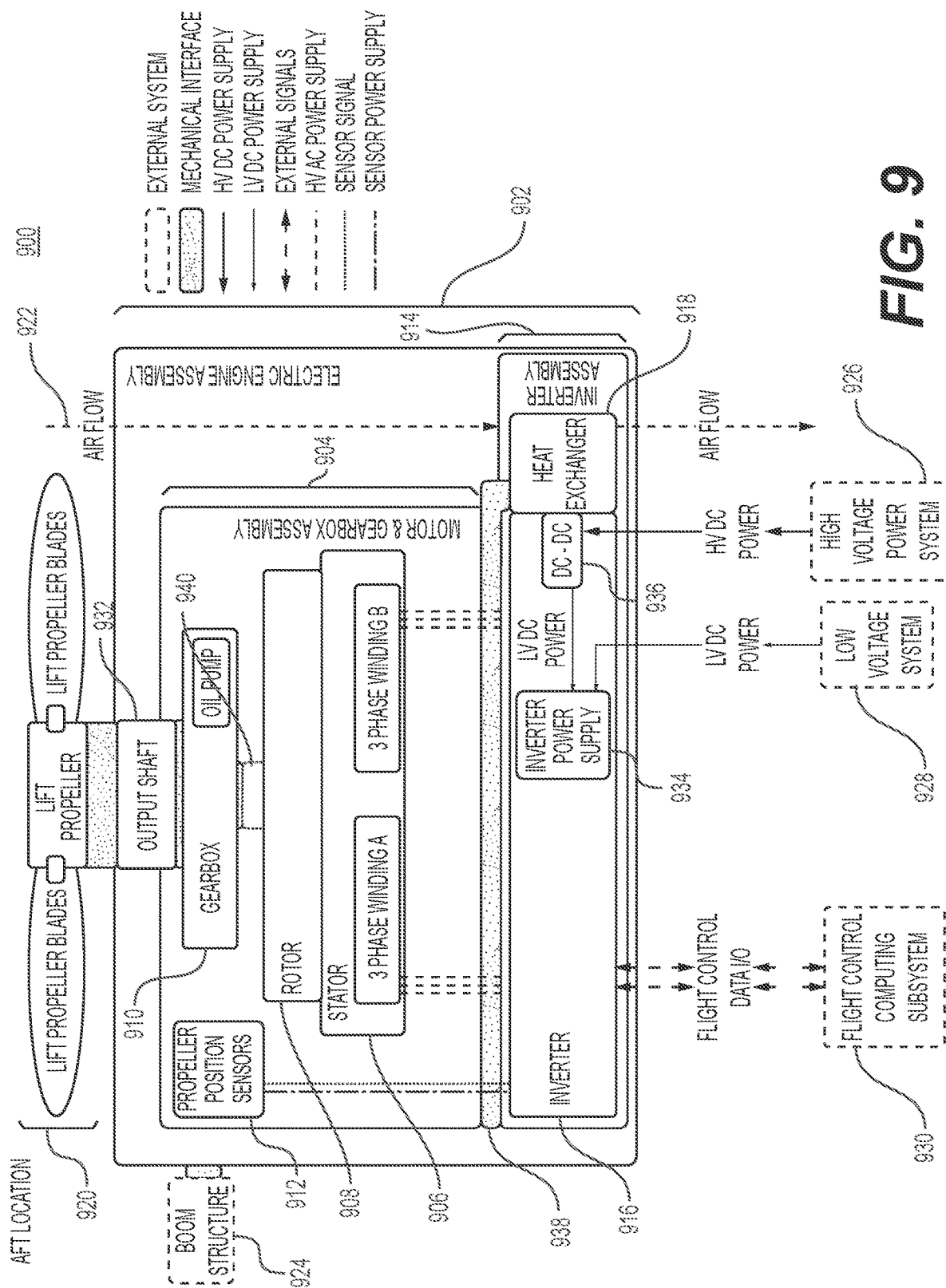
FIG. 9 is a schematic diagram illustrating an exemplary lift electric propulsion system of a VTOL aircraft, consistent with embodiments of the present disclosure.

FIG. 9 is a schematic diagram illustrating an exemplary lift electric propulsion system of a VTOL aircraft, consistent with disclosed embodiments. A lift electric propulsion system 900 may be mounted or coupled to a boom structure 924 of the aircraft. A lift electric propulsion system 900 may include electric engine assembly 902 aligned along a shaft 940 that is connected to an output shaft 932 that is mechanically coupled to a propeller assembly 920 comprising a hub and tilt propeller blades. In some embodiments, an electric engine assembly 902 may include a motor and gearbox assembly housing 904 aligned along and mechanically coupled to the shaft 940. In some embodiments, a motor and gearbox assembly housing 904 may include an electric motor assembly comprising a stator 906 and a rotor 908. A stator 906 may include multiple stator windings connected to the inverter 916. In such a configuration, a stator 906 may incorporate one or more redundancies and backup measures to avoid a single point of failure in the case. For example, stator 906 may include multiple windings such that, if a winding fails, power may continue to be transmitted to the stator 906 via remaining windings, allowing the electric engine assembly 902 to retain power and continue to generate thrust at the propeller assembly 920.

In some embodiments, a motor and gearbox assembly housing 904 may contain a gearbox 910 aligned along the shaft 940 to provide a gear reduction between the torque of the shaft 932 from the electric engine assembly, comprising a stator 906 and rotor 908, and the output shaft 932. Torque applied to the output shaft 932 may be transferred to the propeller assembly 920. Some embodiments may include a gearbox 910 containing a fluid pump for circulating cooling and/or lubrication fluid. In the embodiment shown, the fluid pump is an oil pump. In such an embodiment, the oil pump may drive a circulation of oil throughout the motor and gearbox assembly housing 904 at a speed equivalent to the rotation of the output shaft 932 to cool and lubricate the gearbox and electric motor components. Some embodiments of a motor and gearbox assembly housing 904 may include propeller position sensors 912 present within the housing that may detect a magnetic field produced by the electric engine assembly to determine a propeller position. Further embodiments may include propeller position sensors 912 that are powered by an inverter 916 and send collected data to an inverter 916 that may be transferred to a flight control computing system 930 among other flight control data.

In some embodiments, an electric engine assembly 902 may also include an inverter assembly housing 914 aligned along an axis sharing the axis of the shaft 924. An inverter assembly housing 914 may include an inverter 916 and an inverter power supply 934. An inverter power supply 934 may accept low voltage DC power from a low voltage system 928 located outside the electric engine assembly 902. An inverter power supply 934 may accept low voltage DC power originating from a high voltage power system 926, located outside the electric engine assembly 902, that has been converted to low voltage DC power via a DC-DC converter 936. An inverter 916 may supply high voltage alternating current to the stator 906 of the electric engine assembly located within the motor and gearbox assembly housing 904 via at least one three-phase winding. An inverter assembly 914 may include an inverter 916 that may send data to and receive data from a flight control computing subsystem 930.

In some embodiments, a motor and gearbox housing 904 may be located between an inverter assembly housing 914 and a propeller assembly 920. Some embodiments may also include a divider plate 938 coupled to the motor and gearbox assembly housing 904 and inverter assembly housing 914. A divider plate 938 may create an enclosed environment for an upper portion of the motor and gearbox assembly housing 904 via an end bell assembly, and may create an enclosed environment for a lower portion of the inverter assembly housing 914 via a thermal plate. In some embodiments, a divider plate 938 may serve as an integral mounting bracket for supporting heat exchanger 918. Heat exchanger 918 may comprise, e.g., a folded fin or other type of heat exchanger. In some embodiments, the electric propulsion system 900 may circulate oil or other coolant fluid throughout the electric engine assembly 902, motor and gearbox assembly 904, or inverter assembly 914 to transfer heat generated from the components to the oil or other coolant liquid. The heated oil or other coolant liquid may be circulated through heat exchanger 918 to transfer the heat to an air flow 922 passing through the fins of the heat exchanger.

In some embodiments, a tiltable electric propulsion system and a lift electric propulsion system may possess similar components. This may be advantageous with respect to many design considerations present within VTOL aircrafts. For example, from a manufacturability standpoint, different types of electric propulsion systems having similar components may be beneficial in terms of manufacturing efficiency. Further, having similar components may be beneficial in terms of risk management as similar components possess similar points of failure and these points of failure may be well explored and designed around when comparing systems having similar components to systems having different components and configurations.

While a tiltable electric propulsion system may possess additional, and in some embodiments different, components compared to a lift electric propulsion system, it should be understood that in some embodiments a tiltable electric propulsion system and a lift electric propulsion system may possess the same configuration of components. For example, in some embodiments, a tiltable and lift electric propulsion system may contain the same components while the lift electric propulsion system may be coupled to a boom, wing, or fuselage of the aircraft such that it may not be able to provide thrust in as many directions as tiltable electric propulsion system.

FIGS. 10A-10B are illustrations of an exemplary lift electric propulsion systems of a VTOL aircraft, consistent with disclosed embodiments. FIGS. 10A and 10B possess like numerals and refer to similar elements of lift electric propulsion systems 1000A and 1000B. As such, similar design considerations and configurations may be considered throughout the embodiments FIG. 10A illustrates a side profile of a lift electric propulsion system 1000A in a lift configuration integrated into a boom 1010A consistent with this disclosure. A lift electric propulsion system 1000A may comprise an electric engine assembly 1002A housed within a boom 1010A of a VTOL aircraft. In some embodiments, a lift configuration may include the electric engine assembly 1002A being posited vertically within the boom 1010A. An electric engine assembly 1002A may comprise an electric motor assembly, a gearbox assembly, an inverter assembly with power connection channels 1008A, and a heat exchanger 1004A, as described herein. The electric engine assembly 1002A may be mechanically coupled to a propulsion assembly 1006A comprising a shaft flange assembly and propeller blades.

FIG. 10B illustrates a top-down view of a lift electric propulsion system 1000B in a lift configuration integrated into a boom 1010B, consistent with this disclosure.

Some embodiments of the disclosed electric engine may generate heat during operation and may comprise a heat management system to ensure components of the electric engine do not fail during operation. In some embodiments, coolant may be used and circulated throughout individual components of the engine, such as an inverter, gearbox, or motor, through some of the components, or through all of the components of the engine to assist with managing the heat present in the engine. Some embodiments may include using air cooling methods to cool the electric engine or using a mixture of coolant and air to manage the heat generated during operation in the electric engine. In some embodiments, the coolant being used may also be the same liquid that is being used as lubricant throughout the inverter, gearbox, or motor. For example, components of the electric engines may be cooled using a liquid or air or using a mixture of air and liquid cooling. As another example, a motor may be cooled using air cooling while the inverter and gearbox are cooled using liquid cooling. It should be understood that a mixture of cooling may be used for any combination of electric engine components or within each component.

In some embodiments, oil may be used as a lubricant throughout an electric engine and may also be used as coolant fluid to assist in managing the heat generated by the engine during operation.

Some embodiments may use oil to lubricate the electric engine and to cool the electric engine. Such embodiments may require additional volumes of oil. In such embodiments, the additional oil may allow for removal of traditional components that may be used to cool such an electric engine. For example, if the electric engine were cooled by another liquid such as glycol, the engine may comprise separate heat exchangers for both the lubricant fluid and the coolant fluid. As such, in embodiments where a single fluid is being used for both lubrication and cooling, such as oil, an increase in oil would be present but there would only be a need for one heat exchanger, so there may be a decrease in mass, due to using less heat exchangers and potentially other components not being required, of the overall system and a more appealing drag profile may be present. Further, using one substance for the lubrication and cooling of the engine may increase efficiency of the system due to the reduction in mass and the benefits of cooling the engine with a substance rather than relying on air cooling which may have issues traveling throughout the engine.

Figure 10C:
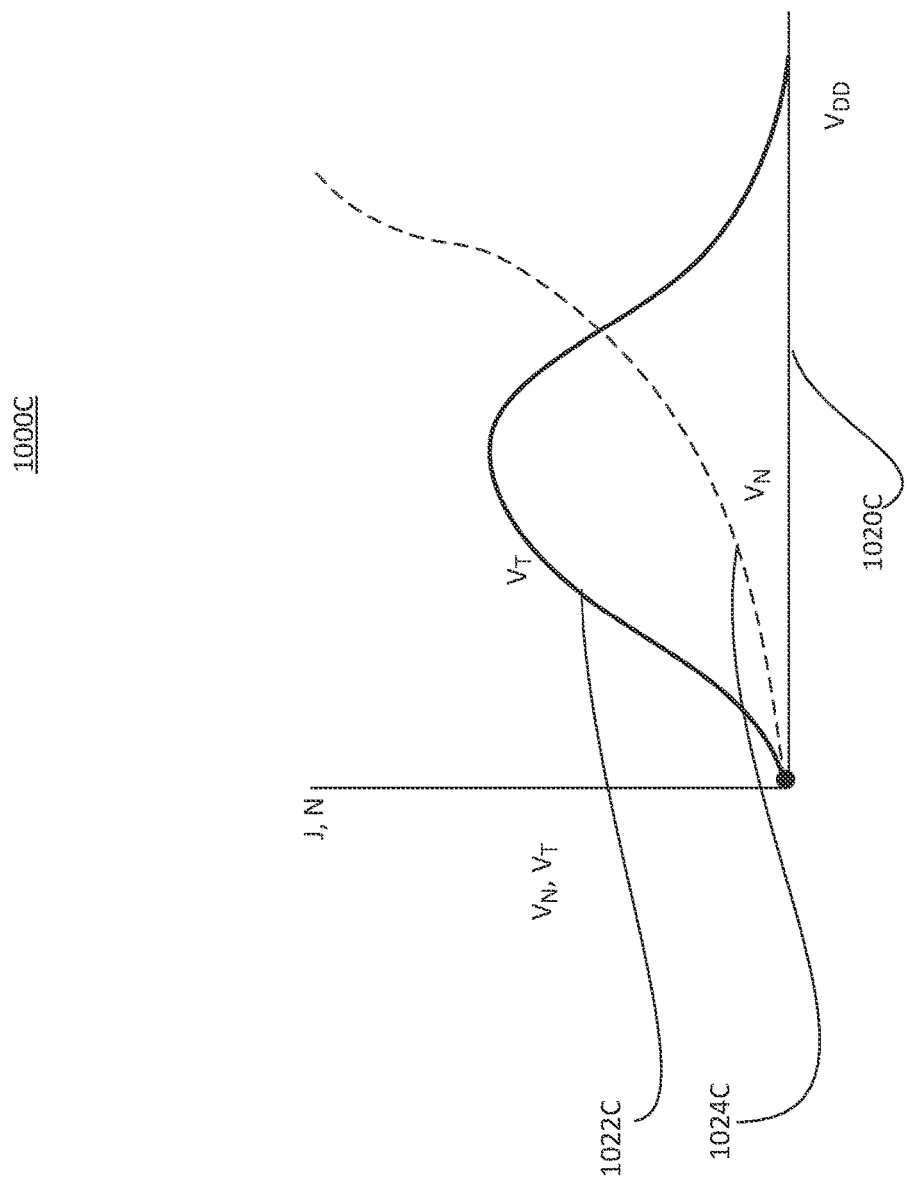
FIG. 10C is an illustration of a graph of airflow as a function of aircraft speed, consistent with embodiments of the present disclosure.

FIG. 10C illustrates a graph 1000C of airflow as a function of aircraft speed, consistent with embodiments of the present disclosure. Graph 1000C illustrates an example of edgewise flow 1022C and axial flow 1024C as a function of the airspeed 1020C for a tilt propeller. For example, graph 1000C may schematically illustrate the airflows during the transition period from a lift configuration to a cruise configuration according to a prescribed tilting schedule of the tilt propeller and blade pitch schedule (e.g., a chosen blade pitch angle as a function of propeller tilt angle). At hover (e.g., zero or low airspeed), there is no axial flow in the present example. As airspeed increases, there is an increase in axial flow 1024C and an increase in edgewise flow 1022C. As tilt occurs and the aircraft transitions to a cruise configuration, the edgewise flow 1022C decreases as the axial flow 1024C remains (and increases with increasing airspeed). Thus, it will be recognized that VTOL aircraft may require a bearing system capable of sustaining a wide range of loads from both axial and edgewise airflows.

FIG. 10D illustrates graphs of airflow as a function of aircraft speed, consistent with embodiments of the present disclosure. Graph 1030D and graph 1034D illustrate the in-plane (e.g., crossflow) velocity component and the out-of-plane (e.g., inflow) velocity component, respectively, on an eVTOL tilter disk according to a prescribed tilting schedule of the tilt propeller and blade pitch schedule. Graph 1030D and graph 1034D may be non-dimensionalized by propeller rotational speed and propeller radius. It will be appreciated that, as illustrated in graph 1030D and graph 1034D, the tilt propellers for an exemplary VTOL/eVTOL aircraft can experience various combinations of axial and edgewise flow based on the tilt angle of a tilt propeller. For example, graph 1030D may involve a change 1032D in vehicle angle of attack (AoA) due to the tilting propellers reaching a cruise setting (e.g., −2 degrees as an example). As such, retention systems for propellers may be configured to sustain varying loads.

Exemplary Propeller Embodiments

Disclosed methods may involve systems, apparatus, and methods for retaining propellers and propeller blades. It will be recognized that propellers, including propeller blades, may experience various forces during operation, including centrifugal forces, as well as torques such as bending torques. For example, centrifugal force may pull a blade away from connections to a propulsion system, including electric propulsion systems as described herein. In some examples, eVTOL propellers may experience large out-of-plane bending loads on the propeller blades from non-axial inflow. Thus, it will be appreciated that propeller blades should be retained to counteract such forces and enable propellers to function during any stage of operation. Retention, as described herein, may refer to preventing an object or component from leaving (e.g., leaving its preferred operating position). Retaining may involve keeping possession of an object, or keeping it in a particular position. For example, retention may refer to preventing an object from becoming displaced from the retaining element by more than a tolerable amount during operation. For example, retention may include preventing an object or component from becoming dislodged, disconnected, or otherwise displaced from a mount, support, guide, or other retaining element. It will be recognized that retention may allow movement in some degrees while restricting movement in other degrees. For example, while a blade may be prevented from completely exiting a point of attachment, the blade my be allowed to rotate freely and/or adjust to appropriate blade angles.

Figure 11:
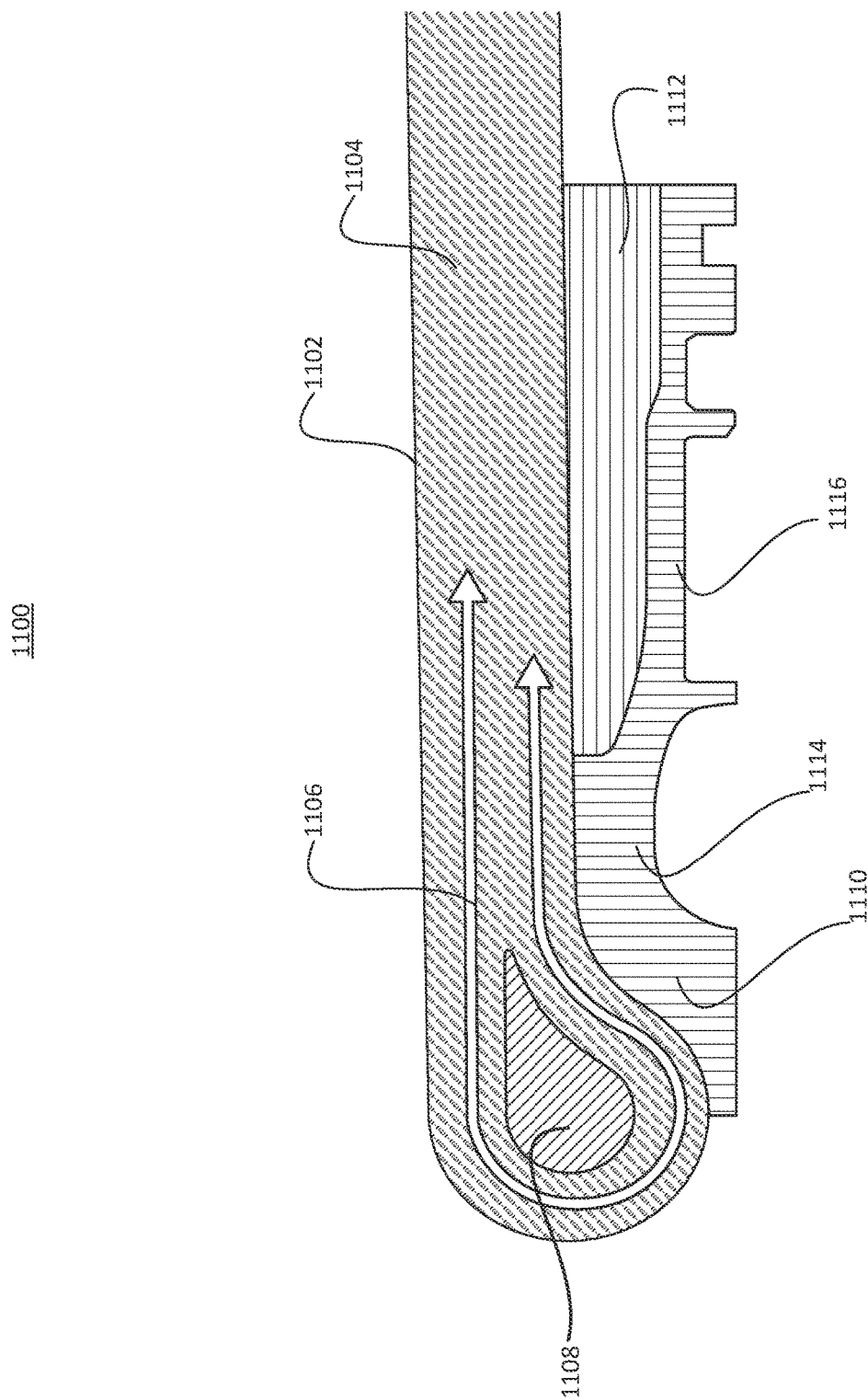
FIG. 11 is an illustration of a cross-section of a propeller blade retention system, consistent with embodiments of the present disclosure.

FIG. 11 illustrates a partial cross-section of a retention system 1100 for a propeller blade, consistent with embodiments of the present disclosure. Retention system 1100 may be configured to retain a propeller blade in an aircraft such as, e.g., aircraft 100-400 of FIGS. 1-4. Retention system 1100 may include blade 1102, which may comprise composite materials. For example, blade 1102 may include blade laminate 1104. Blade laminate 1104 may include a lightweight, high-strength material such as, e.g., carbon fiber, such as braided carbon fiber, as well as fiberglass, such as flat pattern woven fiberglass. Blade 1102 may include various properties, including erosion protection and lightning conductive paths. Blade 1102 may include a continuous fiber path 1106 having braided carbon fiber in biaxial and unidirectional sleeving. Alternatively or additionally, blade 1102 may further comprise a flat pattern unidirectional carbon fiber having a continuous fiber path 1106. In some examples, fiberglass in blade 1102 may comprise biaxial sleeving to galvanically isolate carbon from metallic portions of blade 1102. It will be appreciated that disclosed embodiments of blades including fiber (e.g., continuous material interlocked around a metallic hoop) may provide stronger load transfer in comparison to blades which rely on adhesives or fasteners for material transfer. In some embodiments, retention system 1100 may include a reversing ring 1108 extending through and filling a cavity or bore in a root portion of blade 1102. A reversing ring may refer to any retaining element configured to resist centrifugal loads. For example, reversing ring 1108 may reinforce a root portion (e.g., base) of blade 1102 so that it may be more securely retained by, e.g., a retention sleeve 1110. Fibers of blade 1102 may be wrapped around reversing ring 1108 along continuous fiber path 1106 such that the reversing ring 1108 counteracts any centrifugal forces pulling on blade 1102. In some embodiments, reversing ring 1108 may be made of metals, such as titanium.

In some embodiments, a propeller blade may contact one or more sleeves. A sleeve may refer to a covering or lining for a component that may partially or completely surround the component along a predetermined direction. In some embodiments, retention system 1100 may include a retention sleeve 1110. Retention sleeve 1110 may comprise a sleeve configured to assist in retaining a blade such as blade 1102. Retention sleeve 1110 may surround blade 1102 such that a portion of the retention sleeve 1110 may abut a portion of blade 1102. Retaining sleeve 1110 may include a first portion 1114 and second portion 1116. In some examples, the entire length of retention sleeve 1110 in an axial direction of blade 1102 may abut blade 1102. Retention sleeve 1110 may include metals, such as steel, and may be attached to blade 1102 such that blade 1102 may be fixed to retention sleeve 1110. In some embodiments, retention sleeve 1110 may be attached to blade 1102 by secondary bonding, such as with an adhesive material and/or bond primer. In some embodiments, blade 1102 may abut first portion 1114 of retention sleeve 1110. It will be appreciated that as blade 1102 may contact the first portion 1114 of retention sleeve 1110, the blade may also be fastened around reversing ring 1108, thereby enabling greater retention against centrifugal loads. In some embodiments, retention system 1100 may include a filler sleeve 1112. For example, filler sleeve 1112 may contact blade 1102, such as by contacting a blade spar (e.g., a structural element of a blade which may carry loads experienced by the blade and which may be formed by fibers as described herein) of blade 1102. A filler sleeve may comprise a sleeve configured to transmit bending loads experienced in retention system 1100, including transmitting bending loads between portions of blade 1102, such as between composite and metallic portions of blade 1102. Filler sleeve 1112 may include any material capable of transmitting loads and/or absorbing forces, including plastics, foam, or rubber, as non-limiting examples. It will be appreciated that filler sleeve 1112 may include lightweight materials such as plastics, thereby enabling weight savings while also enabling transmission of loads from the blade. In some embodiments, filler sleeve 1112 may be disposed between blade 1102 and retention sleeve 1110. For example, filler sleeve 1112 may be positioned between blade 1102 and retention sleeve 1110 such that an inner side of filler sleeve 1112 contacts blade 1102 and an outer side of filler sleeve 1112 contacts the second portion 1116 of retention sleeve 1110.

Figure 12:
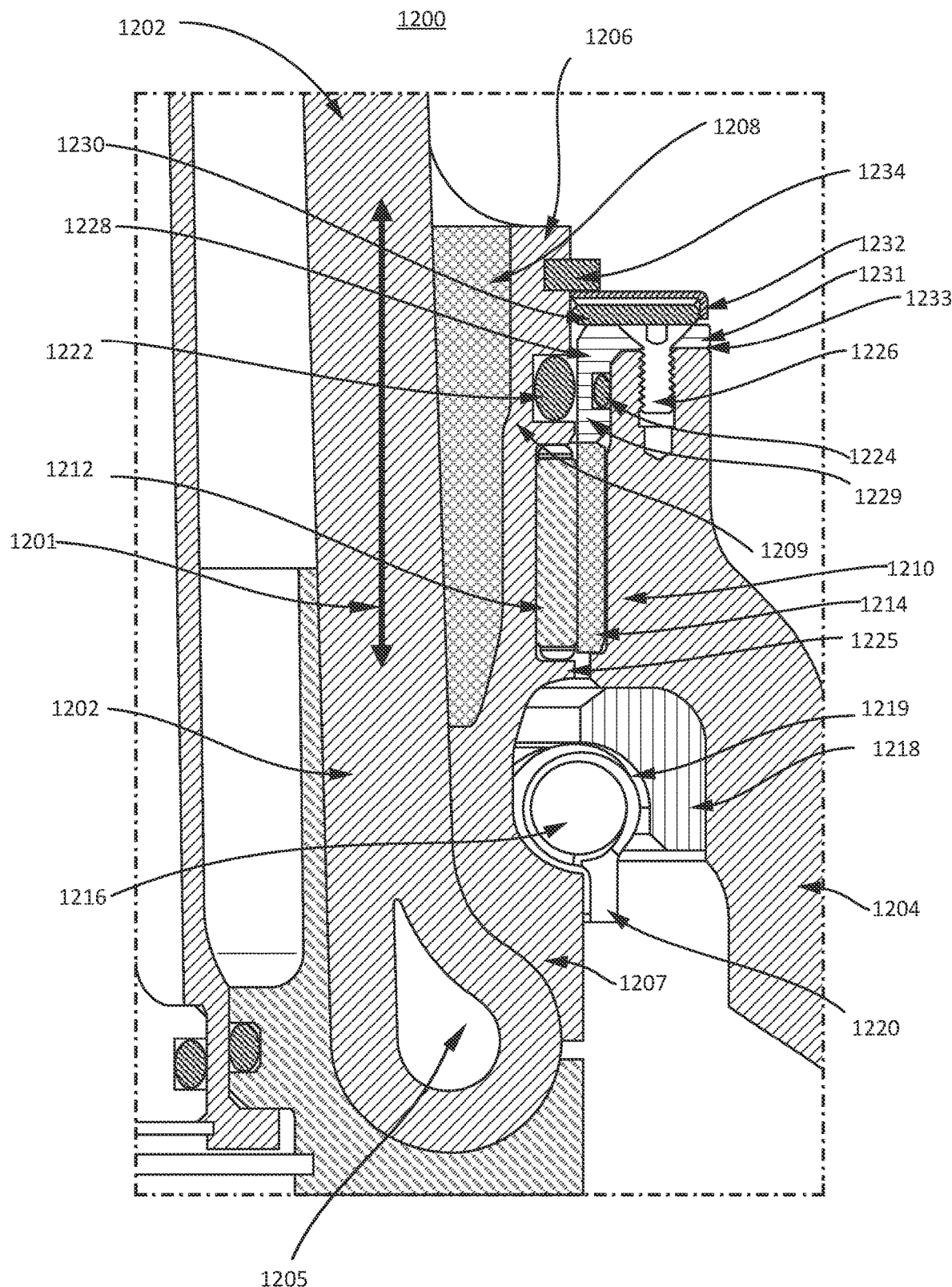
FIG. 12 is an illustration of a cross-section of a propeller blade retention system, consistent with embodiments of the present disclosure.

FIG. 12 illustrates a partial cross section of a retention system 1200 for a propeller blade, consistent with embodiments of the present disclosure. Retention system 1200 may include a hub 1204, which may comprise any suitable material such as metals (e.g., aluminum). A hub may refer to an assembly, receptacle, or connecting component for one or more propeller blades. In an example, shaft flange assembly 806A, as referenced in FIG. 8A, may include a hub such as hub 1204. A hub may involve a case such that components may be contained within the hub. In some embodiments, a hub may include a socket. A socket may refer to any opening such as a recess, pocket, chamber, or cavity. A socket may involve a hollow portion, or a socket may comprise an inner surface of a hollow portion of the hub configured to receive a propeller blade. For example, a hub may include one or more openings capable of receiving a component such as a propeller blade or a component coupled to a propeller blade. For example, a hub may include multiple openings such that a single hub may be capable of receiving multiple blades. In some embodiments, hub 1204 may include a socket formed by an inner surface 1210 of hub 1204. A hub may include one or more openings, such as a socket, capable of receiving a component, such as a component which extends through the socket. In some embodiments, the component may comprise a blade 1202 that may extend into a socket, such as a socket formed by an inner surface of hub 1204. Extending into may refer to a component which protrudes or continues past, such as a component which protrudes into an opening. For example, blade 1202 may extend into a socket of hub 1204, such as in a direction of blade axis 1201. Blade 1202 may have a blade axis 1201, which may be a virtual line or a reference line along the length of the blade. For example, blade axis 1201 may be in a longitudinal direction along blade 1202. Blade axis may comprise an axis about which blade 1202 rotates when changing its pitch angle. Therefore, while the arrows in FIG. 12 may indicate a direction of blade axis 1201, the actual blade axis may be offset from the location of the arrows. For example, blade axis 1201 may correspond to, e.g., blade axis 1304 of FIG. 13 discussed below. As discussed herein, blade 1202 may be disposed around reversing ring 1205 such that the reversing ring 1205 may extend through the blade cavity. In some embodiments, hub 1204 may include sleeves, bearings, and other components which may assist in retaining blade 1202 within the hub. For example, retention sleeve 1206 may be within the hub 1204. Retention sleeve 1206 may include a first portion 1207 and a second portion 1209, as described herein. Retention sleeve 1206 may be positioned between blade 1202 and inner surface 1210 of hub 1204 such that first portion 1207 may contact blade 1202, and filler sleeve 1208 may be disposed between blade 1202 and second portion 1209 of retention sleeve 1206.

In some embodiments, retention system 1200 may include one or more bearings. Bearings may involve components configured to reduce friction between a plurality of components in relative motion, including assisting in relative motion between moving and/or stationery components. Bearings may have bearing races, such as a bearing having one or more races. Bearing races may refer to tracks or paths which bearings may ride on, enabling lower friction between components which move. For example, a bearing may have an inner race and an outer race, where bearing elements may be disposed on the outer circumference on the inner race and the inner circumference of the outer race. Disclosed embodiments may include bearings with separate races or bearings having a shared race. In some examples, bearing races may comprise metals, such as steel. As a non-limiting example, bearings may include ball bearings, roller bearings, or needle bearings. Some disclosed embodiments may comprise a bearing 1212 disposed between the second portion 1209 of retention sleeve 1206 and the inner surface 1210 of hub 1204. Bearing 1212, which may be a first bearing in retention system 1200, may be adjacent to the retention sleeve 1206. In some embodiments, retention sleeve 1206 may include one or more races for a bearing. For example, retention sleeve 1206 may include an inner race for bearing 1212 and/or an inner race for bearing 1216. For example, retention sleeve 1206 may include a third race, which may refer to an inner race for bearing 1216. In some examples, bearing 1212 may be recessed into retention sleeve 1206, such as retention sleeve 1206 including a slot or notch which forms an inner race for bearing 1212. In some embodiments, bearing 1212 may include a first race 1214 (e.g., an outer race) which contacts the inner surface 1210 of hub 1204. In some embodiments, bearing 1212 may include a needle bearing element. For example, bearing 1212 may include multiple needle bearing elements, which may comprise metals such as steel, contacting first race 1214. Some disclosed embodiments include a bearing disposed between the first portion of the retention sleeve and the inner surface of the hub. For example, retention system 1200 may include second bearing 1216 which may be disposed between first portion 1207 of the retention sleeve 1206 and the hub 1204. Second bearing 1216 may have one or more races, including a second race 1218 contacting the inner surface 1210 of hub 1204. In some embodiments, first race 1214 and second race 1218 may be detachable components that can be removable from the hub, which may enable easier service of the races. In some examples, retention sleeve 1206 may include a fourth race, such as an inner race for second bearing 1216. In some embodiments, second bearing 1216 may include an angular contact bearing. In some embodiments, second race 1218 may comprise an inner surface 1219 that may be radially flush with first race 1214 in a radial direction from blade axis 1201. Two surfaces may be considered flush with each other when the surfaces are aligned with, or parallel to, each other in a reference direction. For example, the inner surface 1219 of second race 1218 may be aligned with first race 1214 at a certain radial distance from blade axis 1201. It will be appreciated that a configuration involving second race 1218 being radially flush with first race 1214 may enable easier manufacturability. For example, alignment of the races may reduce the size of the hub, thereby reducing weight while still allowing assembly of the blade. In some examples, first race 1214 and second race 1218 may comprise separate raceways which can be removable from hub 1204 for servicing. Races, such as first race 1214 and/or second race 1218, may be press fit to hub 1204. Some disclosed embodiments may include a ball separator cage disposed between the second race and the first portion of the retention sleeve. For example, ball separator 1220 may be disposed between second race 1218 and first portion 1207 of retention sleeve 1206. In some examples, ball separator 1220 may assist in preventing balls (e.g., bearing elements) from scraping on each other, and ball separator 1220 may also provide improvements for assembly by enabling a more efficient process of loading bearing elements into bearing races.

Retention systems according to embodiments of the present disclosure may advantageously be configured to withstand high loads in a compact and lightweight arrangement to satisfy the particular needs of eVTOL or other electric aircraft. For example, in some embodiments, the ratio of the weight of hub 1204 (e.g., a total weight including bearings 1212 and 1216 as well as bushings and mounting hardware, etc.) to the weight of blades 1202 (i.e., all blades retained in the hub 1204) may be minimized, such as within a range of 1.5 to 2.25. In some embodiments, a ratio of the weight of the body of hub 1204 (e.g., an empty shell excluding bearing elements, etc.) to the weight of the bearings in retention system 1212 and 1216 (e.g., the total weight of all bearing for each blade 1202) may be in a range of 0.85 to 1.2.

In some embodiments, retention sleeve 1206 may include an annular rib 1225. A rib may refer to a ridge, protrusion, or projection, such as a protrusion of retention sleeve 1206. In some embodiments, first race 1214 and second race 1218 may be spaced apart by annular rib 1225. For example, annular rib 1225 may separate first race 1214 from second race 1218. In some embodiments, annular rib 1225 may be flush with first race 1214 and second race 1218 in a radial direction, such as in a radial direction with respect to blade axis 1201. It will be appreciated that by spacing apart first race 1214 and second race 1218, annular rib 1225 may prevent wear occurring from contact between first race 1214 and second race 1218 and thereby preventing wear to the corresponding bearings, as well as providing a separation or spread between first bearing 1212 and second bearing 1216. Annular rib may further provided structural reinforcement for supporting first bearing 1212 and second bearing 1216.

It will be recognized that a retention system may include various components which can assist in maintenance of the system, including components which can reduce wear in the system. For example, in some embodiments, retention system 1200 may include a cap 1228, as referenced in FIG. 12. Cap 1228 may comprise a selectively removable or attachable cap. A cap may refer to any component for protecting a hub from wear, such as an endcap (e.g., an endcap portion of the hub). For example, cap 1228 may comprise a portion disposed between blade 1202 and hub 1204, thereby assisting in protecting hub 1204 from loads due to blade 1202. Cap 1228 may also protect hub 1204 from damage during operation and/or servicing, including damage from debris. Cap 1228 may comprise any suitable material, including plastics or metals (such as aluminum which may be coated (e.g., hard anodized) to improve wearability). In some embodiments, cap 1228 may include a body portion 1229 and a flange portion 1231. Body portion 1229 may be a section of cap 1228 which contacts inner surface 1210 of the hub 1204. Body portion 1229 may be disposed between retention sleeve 1206 and hub 1204. In some embodiments, body portion 1229 may be disposed between the second portion 1209 of retention sleeve 1206 and the inner surface 1210 of the hub 1204. In some examples, body portion 1229 may be flush with first race 1214 in a radial direction from blade axis 1201. In some embodiments, cap 1228 may include a flange portion 1231. A flange portion may refer to any protruding ridge, such as a lip or rim. Flanges may assist in attachment between components, stabilization, and/or transferring forces between components. Flange portion 1231 may extend outward from body portion 1229. Extending outward may refer to extending in a direction away from a component. For example, the flange portion 1231 may extend outward from body portion 1229, such as in a direction away from blade axis 1201. In some embodiments, the flange portion 1231 may be attachable to an end surface 1233 of hub 1204. Attachable to the end surface may refer to the flange portion being removably fixed and/or permanently fixed to the end surface. For example, the flange portion 1231 may be coupled to the end surface 1233, thereby coupling cap 1228 to hub 1204. In some examples, flange portion 1231 may be attached to the end surface 1233 by one or more fasteners, including screws or bolts, such as screw 1226 which may extend through flange portion 1231 into hub 1204. Screw 1226 may have a thread locking coating applied to its threads. An exemplary assembly configuration may include screw 1226 secured under shim 1230, shim carrier 1232, and retaining ring 1234. It will be appreciated that cap 1228 may assist in reducing wear to hub 1204, including wear from the blade 1202, such as during changes in blade angle during operation. For example, cap 1228 may prevent blade 1202, retention sleeve 1206, or other components from rubbing in wear regions, such as against hub 1204 or the inner surface of hub 1204, thereby offering protection from wear. In some embodiments, cap 1228 may assist in retaining one or more bearing races, such as race 1214, against centrifugal loads. Furthermore, it will be appreciated that the position of cap 1228 as described herein may allow for easier access to the cap during maintenance or service. For example, cap 1228 may be a replaceable cap, and may be removably attached, as described herein. Thus, the location of cap 1228 may enable the cap to be a replaceable wear surface, as the wear region may be separate from the inner surface of the hub, thereby allowing more efficient service. Additionally, cap 1228 may enable easier installation of bearing races (e.g., first race 1214) from the exterior or outside of hub 1204 rather than having to feed the race from the interior of the hub during assembly, which may involve difficulty in aligning first race 1214 (e.g., needle race). Further, the position of the cap 1228 in wear regions may allow cap 1228 to include different material and coating combinations that enable improved service performance, such as hard anodized coating on the aluminum cap, which can improve the durability of the surface but may not be practical materials for the entire hub, thereby representing an improvement over other systems.

Some disclosed embodiments include a shim carrier disposed around the second portion of the retention sleeve. Referring to FIG. 12, retention system 1200 may include a shim carrier 1232. A shim carrier may be any covering or enclosing for a shim, such as shim 1230. A shim may be any component configured to fill or occupy a space or gap. Shims may assist in occupying spaces, such as tolerances between mating components, as well as aligning components. For example, shim 1230 and shim carrier 1232 may prevent looseness in blade 1202, such as when the propeller may not be rotating. In some examples, shims may include materials such as plastics and/or metals, including stainless steel. For example, shim 1230 may have an annular shape, such as a ring, and may encircle retention sleeve 1206. In some embodiments, shim 1230 may be adjacent to the flange portion 1231 of cap 1228. For example, shim 1230 may be positioned above flange portion 1231. In an example, shim 1230 may contact a surface of flange portion 1231. In some embodiments, shim carrier 1232 may be disposed around the retention sleeve 1206. For example, shim carrier 1232 may be disposed around the second portion 1209 of retention sleeve 1206, such that the shim carrier 1232 surrounds or encloses a portion or the entirety of retention sleeve 1206. In some embodiments, shim carrier 1232 may enclose shim 1230 such that shim 1230 may be disposed between shim carrier 1232 and flange portion 1231. For example, shim carrier 1232 may cover a surface of shim 1230 or shim carrier 1232 may enclose shim 1230 by covering one or more surfaces of shim 1230. It will be appreciated that shim 1230 may be a replaceable device for protection against wear, and the configuration of shim 1230 and shim carrier 1232 may enable easier access for maintenance and/or replacement over other systems.

As described herein, in some embodiments, a retention system may include a wear region. For example, referring to FIG. 12, retention system 1200 may include components which can assist in preventing wear, such as blade seal 1222, sealing ring 1224, and retaining ring 1234. Some disclosed embodiments involve a retaining ring 1234 disposed radially outward from retention sleeve 1206 with respect to blade axis 1201. Disposed radially outward may refer to a component being further, in a radial direction (e.g., along a direction pointing along a radius from the center of blade 1202, such as going outward from blade 1202) with respect to blade axis 1201, than another component. For example, retaining ring 1234 may be disposed around section portion 1209 of retention sleeve 1206. In some embodiments, retention sleeve 1206 may include a groove or indentation such that retaining ring 1234 may be recessed into retention sleeve 1206. Retaining ring 1234 may be any fastener, including snap rings, circlips, or clips, which may assist in preventing unwanted component movement, such as limiting undesired movements of blade 1202 into hub 1204 (e.g., an axial direction along the blade when the propeller may not be rotating). In some embodiments, retaining ring 1234 may comprise metal, such as stainless steel. In some embodiments, retaining ring 1234 may be disposed axially outward from shim carrier 1232 with respect to the blade axis. Axially outward may refer to a component being further along, in an axial direction, than another component, such as further along a blade axis, in a direction toward a blade tip and away from a blade root or hub. For example, retaining ring 1234 may be further outward from shim carrier 1232 in an axial direction with respect to blade axis 1201. In some examples, retaining ring 1234 may contact shim carrier 1232, thereby providing retention in an axial direction to components including shim carrier 1232 and shim 1230. For example, retaining ring 1234 may be configured to retain shim carrier 1232 while allowing relative motion, in a rotational direction about blade axis 1201, between the retaining ring 1234 and shim carrier 1232. Alternatively or additionally, such an arrangement may allow relative rotational motion between shim carrier 1232 and shim 1230. Therefore, blade 1202 may perform frequent blade pitch changes under various bending loads while absorbing a substantial portion of the associated wear and degradation at inexpensive or easily replaceable components. Further, said components may comprise highly durable materials or hard coatings to further extend the lifetime of such components. For example, retaining ring 1234 or shim carrier 1232 may comprise metals, ceramics, anodized layers or other durable materials that could not feasibly be applied to the entire hub 1204 or retention system 1206 due to weight, cost, tensile or flexural strength, or other material properties or functional considerations.

Some disclosed embodiments may comprise a blade seal disposed between the retention sleeve and the body portion of the cap. Referring to FIG. 12, blade seal 1222 may be disposed between the retention sleeve 1206 and the body portion 1229 of cap 1228. Blade seals may be any sealing device or component, such as gaskets or O-rings. In some examples, retention sleeve 1206 may include a groove or notch such that blade seal 1222 may be recessed into retention sleeve 1206. Blade seal 1222 may assist in closing or filling gaps. For example, blade seal 1222 may be an O-ring which contacts and presses against cap 1228, such as pressing against the body portion 1229. Thus, blade seal 1222 can assist in sealing the joint between the blade 1202 and the hub 1204 (e.g., during movement of the blade), as well as retaining fluids such as lubricants and coolants (e.g., retaining fluids such as oil from escaping) which may be present in retention system 1200. For example, oil may be present in retention system 1200 to assist in lubrication of bearings. In some examples, blade seal 1222 may also prevent grit, debris, or other contaminants from entering retention system 1200.

Some disclosed embodiments include a sealing ring disposed between the body portion of the cap and an inner surface of the hub. A sealing ring may refer to a sealing component, such as an O-ring. Retention system 1200 may include a sealing ring 1224 positioned between the body portion 1229 of cap 1228 and the inner surface 1210 of hub 1204. In some embodiments, body portion 1229 may have an incision, and sealing ring 1224 may be positioned within the incision. Sealing ring 1224 may provide a static seal between cap 1228 and hub 1204, thereby preventing lubricants such as oil inside hub 1204 from leaking past cap 1228.

It will be recognized that aircraft described herein, including VTOL (e.g., eVTOL) aircraft, may desire to utilize certain constraints for propeller-rotor rotations per minute, including utilizing lower propeller-rotor RPM than general aircrafts to mitigate noise. Further, VTOL propulsion systems, including propellers capable of tilt and/or lift configurations, may be subject to non-axial inflow, such as during articulation between hover and cruise operation modes. Further, in some embodiments, VTOL aircraft may fly for extended periods in intermediate configurations in which a propeller is not fully tilted into either the lift or cruise configurations. For example, tilt propellers may be maintained at intermediate angles between substantially horizontal and substantially vertical, or may be arranged at constantly changing intermediate angles. This may allow a VTOL aircraft to rely primarily on wingborne flight for efficient air travel, yet achieve speeds well below the stall speed of a comparably sized conventional airplane, even transitioning smoothly to a motionless hovering state. A VTOL aircraft may be configured to move seamlessly above and below such a comparable stall speed during flight without any disruption to the passenger experience. Thus, it will be appreciated that VTOL aircraft may experience centrifugal loads on blade retention systems, as well as large bending loads on blades, that may not present an issue for other aircraft.

Figure 13:
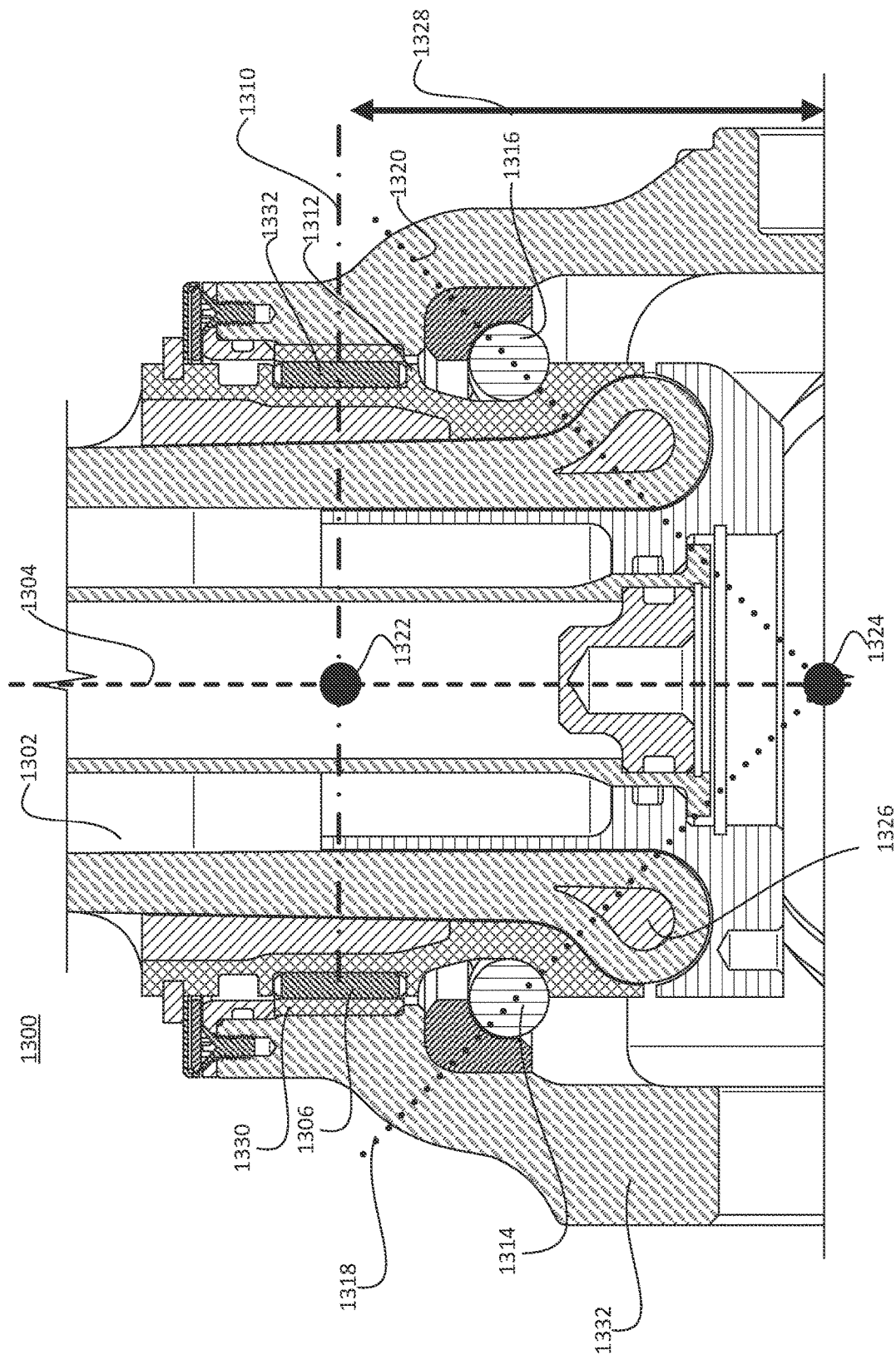
FIG. 13 is an illustration of a cross-section of a propeller blade retention system, consistent with embodiments of the present disclosure.

FIG. 13 illustrates a cross section of a blade retention system 1300, consistent with embodiments of the present disclosure. Blade retention system 1300 may include blade 1302 which may have a blade axis 1304, as described herein. Retention system 1300 may include various bearings in various configurations, such as a two-component unit with first bearing 1306, which may be, e.g., needle roller and cage assembly bearing, and second bearing 1314, which may be, e.g., angular contact ball bearing. First bearing 1306 may surround blade 1302 and have a virtual center 1322. A virtual center may comprise a point at which the lines of action 1310 of first bearing 1306 intersect the axis of rotation of the bearing system. The lines of action may comprise lines of directional load experienced by the bearings, and the axis of rotation of the may substantially coincide with blade axis 1304. For example, the lines of action of first bearing 1306 may run along line of action 1310 perpendicular to the axis of rotation of first bearing 1306. Therefore, first bearing 1306 may represent the case in which the virtual center 1322 of first bearing 1306 substantially coincides with its geometric center. In some examples, first bearing 1306 along with first race 1330 may assist in reacting to the lateral loading of blade 1302 within the hub socket. On the other hand, second bearing 1314 may have a virtual center 1324 that is displaced from their geometric center due to the angular lines of action along axes 1318 (which may be lines of action of loads experienced by second bearing 1314). For example, second bearings 1314 may be angular contact bearings, as described herein, which may provide advantages including improved speed ratings and load carrying for radial and axial loads. As such, it will be appreciated that bearings 1314 may assist in carrying centrifugal loads, such as centrifugal loads experienced on the blade 1302. In an example, the contact surface that bearings 1314 make with their outer race may form an angle with the blade axis 1304, such as, e.g., a 45 degree angle. In some examples, such configurations of bearings 1314 may result in the line of action of loads intersecting one or more components. For example, lines of action along axes 1318 (corresponding to the lines of action of bearings 1314) may intersect reversing ring 1326. For example, in some embodiments, axis 1318 may intersect reversing ring such that a majority of the mass of reversing ring is located axially inward of the axes 1318. Axially inward may refer to the majority of the mass of the reversing ring 1326 being further inward from axis 1318 than the remaining mass with respect to an axial direction of blade axis 1304. In some embodiments, more than 60%, 70%, or 80% of the mass of reversing ring 1326 may be located axially inward of axes 1318. In this way, the loads exerted on reversing ring 1326 by bearings 1314 may press the blade into a retained state within the socket to aid in the retention of blade 1302 in the hub 1332. In this way, disclosed bearing configurations may provide advantages for reacting to and managing loads that may be experienced (e.g., by VTOL and/or eVTOL aircraft). For example, retention system 1300 may include a spread 1328 (e.g., a distance) between virtual center 1322 corresponding to first bearings 1306 and virtual center 1324 corresponding to second bearings 1314. In an example, referring to FIG. 12, annular rib 1225 may also contribute to the distance between first bearing race 1214 and second bearing race 1218. Such spread 1328 may enable an improved capacity of carrying bending loads on retention system 1300. For example, it may be desired to increase bearing spread (including spread 1328) to improve the ability of the retention system to handle loads while minimizing the diameter, axial length, or overall size of the hub and the blade root (e.g., to enable weight savings). In some embodiments, a distance between the first virtual center and the second virtual center may be sufficiently large to withstand centrifugal and/or bending loads sustained during operation of the system. For example, spread 1328 may be configured to be large enough to handle loads experienced during operation. Additionally, in some embodiments, virtual center 1324 may be axially inward of blade 1302. As discussed above, axially inward may refer to virtual center 1324 being further inward than blade 1302 with respect to an axial direction of blade axis 1304. Thus, it will be appreciated that bearing configurations of the disclosed retention systems may be capable of handling loads, such as centrifugal loads and bending loads as described herein, while maintaining structural efficiency (e.g., being lightweight). For example, the ratio of the weight of the bearings to the weight of blade 1302 (e.g., weight of blade not including balance tube ballast weight) may be in a range of 25 to 0.4. In other examples, virtual center 1324 may be axially flush, or axially outward, from blade 1302 with respect to blade axis 1304.

Figure 14:
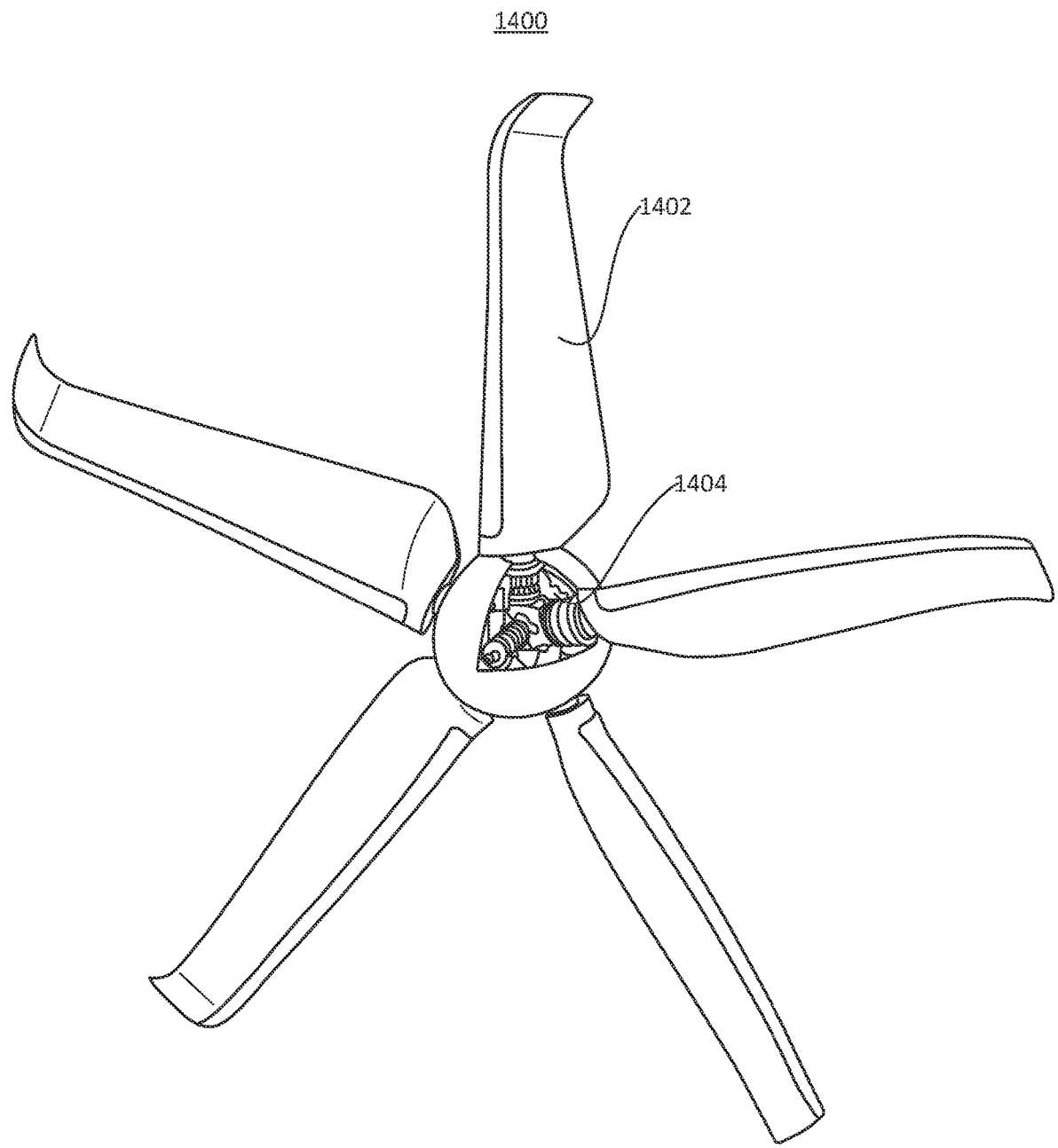
FIG. 14 is an illustration of a propeller, consistent with embodiments of the present disclosure.

FIG. 14 illustrates a propeller 1400, consistent with embodiments of the present disclosure. Propellers, as discussed herein, may refer to propeller for tilt and/or lift configurations for VTOL aircraft. Propeller 1400 may include any number of blades 1402, such as five blades, as an illustrative example. In some examples, propeller 1400 may include hub 1404, and each blade 1402 may be connected to hub 1404, or each blade 1402 may be connected to an individual hub.

Figure 15:
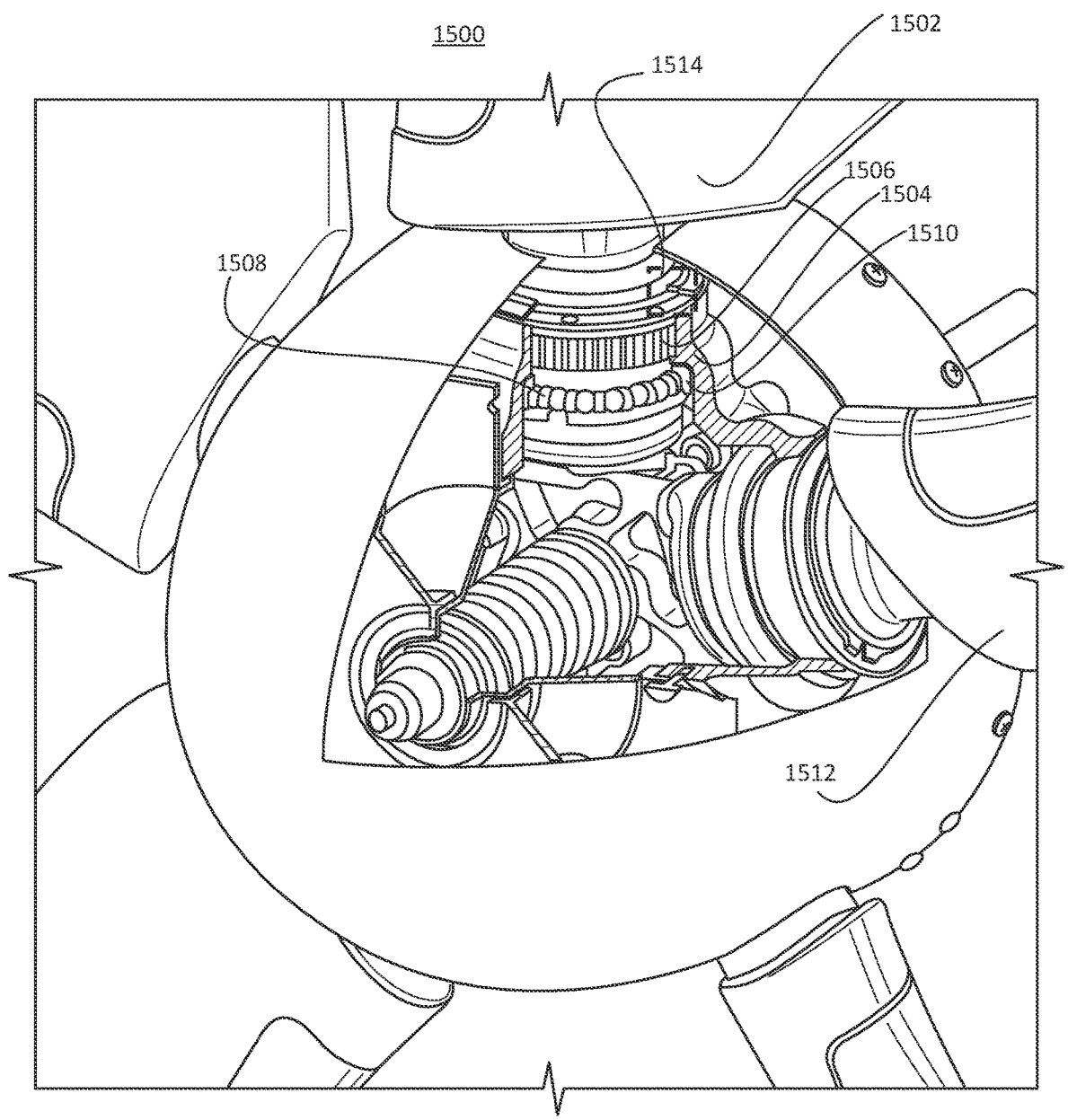
FIG. 15 is a focused view of a propeller, consistent with embodiments of the present disclosure.

FIG. 15 illustrates a magnified view of a propeller 1500, consistent with embodiments of the present disclosure. Propeller 1500 may include one or more blades, such as blade 1502 and blade 1512, which may each be retained by hub 1504. As described herein, first bearing 1506 may have a bearing race contacting hub 1504, and second bearing 1508 may have a bearing race 1510 contacting hub 1504. It will be recognized that blades in propeller 1500 may include a retention system as described herein. For example, each blade in propeller 1500 may include first bearings and second bearings to retain the blade in the hub while propeller 1500 may be spinning. As described herein, retention systems may include wear regions, such as exemplary wear region 1514. In wear region 1514, the blade seal may contact the hub socket inner diameter on the cap, as described herein. As such, the contact region may be a region of higher wear. However, disclosed embodiments, such as the replaceable cap 1228 as illustrated in FIG. 12, allow for cheap and efficient maintenance, while preventing the machining of a new hub or repair of the hub, which can be expensive and inefficient in traditional systems.

Figure 16:
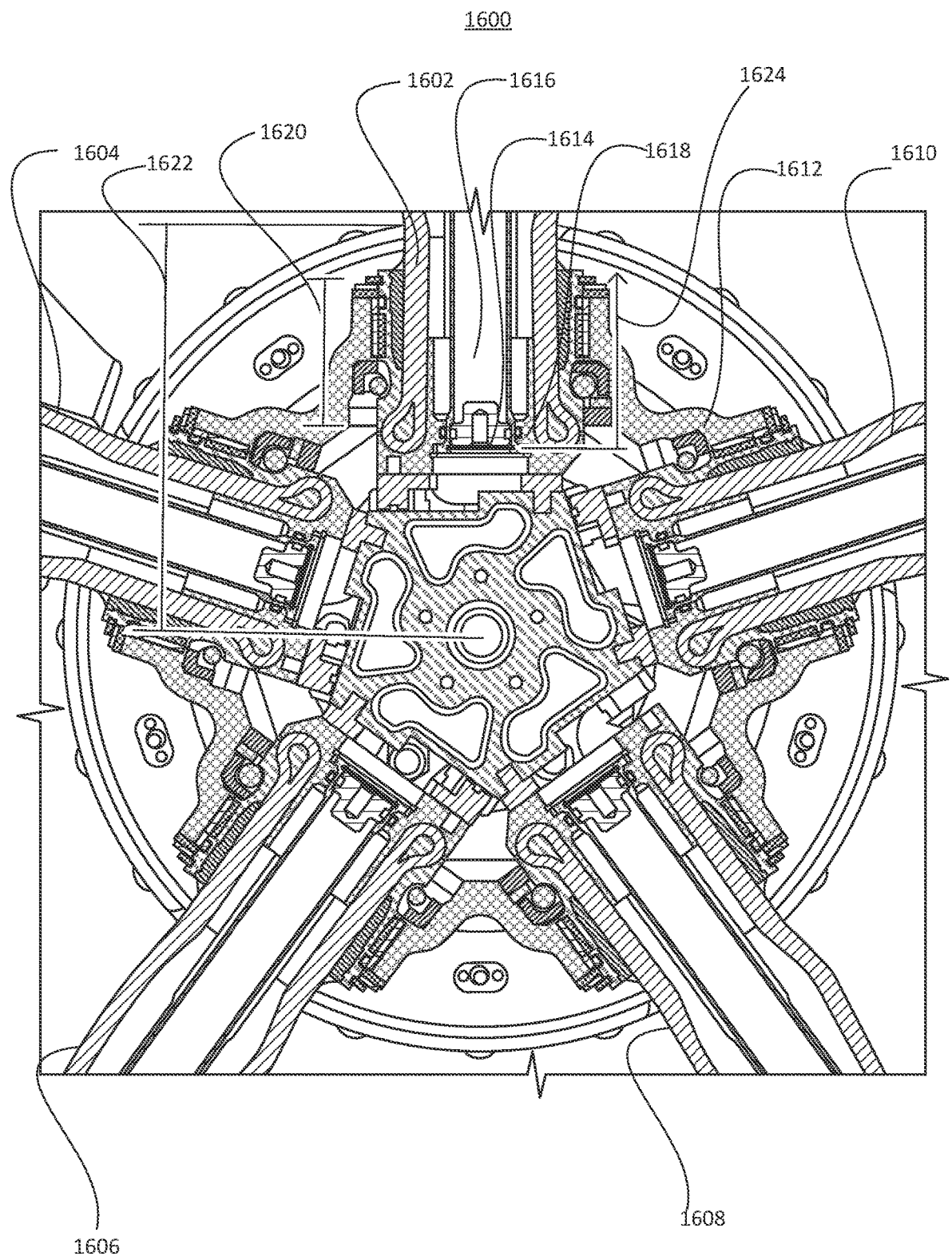
FIG. 16 is a cross-section view of a propeller, consistent with embodiments of the present disclosure.

FIG. 16 illustrates an exemplary illustration of a propeller cross-section, consistent with embodiments of the present disclosure. Propeller 1600 may include blade retention systems, as described herein. Propeller 1600 may include one or more propeller blades, such as blades 1602, 1604, 1606, 1608, and 1610, which may each be retained by hub 1612. In some examples, hub 1612 may be configured to retain any number of blades, such as having sockets for one or more blades. Propeller 1600 may include one or more plugs 1614 which may contact a balance tube 1616. For example, balance tube 1616, which may be disposed within blade 1602, may enclose plug 1614. Propeller 1600 may also include a blade actuating cup 1618, which may be disposed within blade 1602. Blade actuating cup 1618 may be configured to blade 1602 about its axis to maneuver blade 1602 to a desired pitch, and may contact balance tube 1616 and an inner surface of blade 1602.

It will be appreciated that the disclosed embodiments may comprise propeller blade retention systems with configurations that may provide stiff retention against axial and non-axial loads within a compact, lightweight arrangement as described herein. For example, blade 1602 may comprise a ratio of hub radial depth 1622 (e.g., a distance from a rotational centerline of the propeller to the surface of a propeller spinner) to a blade length 1624 (e.g., a length from the bottom of blade actuating cup 1618 to a tip of the blade (not shown)) in a range of 0.2 to 0.3. As an example, the compactness of the retention system with respect to size of the hub may be characterized by a ratio of the socket depth 1620 to hub radius 1622. In some embodiments, the ratio of the socket depth 1620 to the hub radius 1622 may in a range of, e.g., 0.4 to 0.55. As an additional example, blade 1602 may have a ratio of socket depth 1620 to blade length 1624 in a range of 0.11 to 0.14, which may illustrate the compactness of the retention system with respect to the length of the blade. As described herein, a reduced size of the retention system (e.g., a more compact configuration) may provide weight savings and improved drag profiles. In another example, blade 1602 may be characterized by other parameters such as a virtual center spread distance (e.g., a distance between virtual centers, such as spread 1328 between virtual center 1322 and virtual center 1324, as referenced in FIG. 13). For example, in some embodiments the ratio of virtual spread distance 1328 to socket depth 1620 may be in a range of, e.g., 0.4 to 0.5, which may illustrate the compactness of the arrangement of bearing spread within the retention system, as well as the strength provided by the configurations of bearings consistent with the disclosed embodiments.

The foregoing description has been presented for purposes of illustration. It is not exhaustive and does not limit the invention to the precise forms or embodiments disclosed. Modifications and adaptations of the invention will be apparent to those skilled in the art from consideration of the specification and practice of the disclosed embodiments of the inventions disclosed herein.

What is claimed is:
1. A propeller blade retention system, comprising:
a hub including a socket formed by an inner surface of the hub;
a blade extending into the socket,
a retention sleeve having a first portion and a second portion, the first portion abutting the blade,
a filler sleeve disposed between the blade and the second portion of the retention sleeve,
a first bearing disposed between the second portion of the retention sleeve and the inner surface of the hub, the first bearing having a first race contacting the inner surface of the hub;

a second bearing disposed between the first portion of the retention sleeve and the inner surface of the hub, the second bearing having a second race contacting the inner surface of the hub;

a cap comprising:
  a body portion disposed between the second portion of the retention sleeve and the inner surface of the hub; and
  a flange portion extending outward from the body portion and away from the blade, the flange portion attachable to an end surface of the hub;

a blade seal disposed around the retention sleeve and the body portion of the cap;

a sealing ring disposed between the body portion of the cap and an inner surface of the hub; and a shim carrier disposed around the second portion of the retention sleeve, the shim carrier enclosing a shim disposed between the shim carrier and the flange portion of the cap.

2. The system of claim 1, wherein the first bearing comprises a needle bearing element.

3. The system of claim 1, wherein the second bearing comprises an angular contact bearing.

4. The system of claim 1, further comprising a ball separator cage disposed between the second race and the first portion of the retention sleeve.

5. The system of claim 1, further comprising a first virtual center corresponding to the first bearing and a second virtual center corresponding to the second bearing, wherein the second virtual center is axially inward of the blade with respect to a blade axis.

6. The system of claim 5, wherein a distance between the first virtual center and the second virtual center is sufficiently large to withstand centrifugal and bending loads sustained during operation of the system.

7. The system of claim 1, wherein the blade further comprises an internal portion having a cavity disposed around a reversing ring.

8. The system of claim 1, wherein the retention sleeve comprises a third race and a fourth race.

9. The system of claim 1, wherein the retention sleeve comprises an annular rib, wherein the first race and the second race are spaced apart by the annular rib.

10. The system of claim 1, further comprising a retaining ring disposed radially outward from the retention sleeve with respect to a blade axis, and axially outward from the shim carrier with respect to the blade axis.

11. A system for retaining a propeller for an aircraft, the system comprising:
  a propeller having a retention system comprising:
    a hub including a socket formed by an inner surface of the hub;
    a blade extending into the socket,
    a retention sleeve having a first portion and a second portion, the first portion abutting the blade,
    a filler sleeve disposed between the blade and the second portion of the retention sleeve,
    a first bearing disposed between the second portion of the retention sleeve and the inner surface of the hub, the first bearing having a first race contacting the inner surface of the hub;
    a second bearing disposed between the first portion of the retention sleeve and the inner surface of the hub, the second bearing having a second race contacting the inner surface of the hub, wherein the second race is radially flush with the first race in a radial direction from a blade axis;
    a cap comprising:
      a body portion disposed between the second portion of the retention sleeve and the inner surface of the hub; wherein the body portion is flush with the first race in the radial direction from the blade axis; and
      a flange portion extending outward from the body portion and away from the blade, the flange portion attachable to an end surface of the hub;
    a blade seal disposed around the retention sleeve and the body portion of the cap;
    a sealing ring disposed between the body portion of the cap and an inner surface of the hub; and
    a shim carrier disposed around the second portion of the retention sleeve, the shim carrier enclosing a shim disposed between the shim carrier and the flange portion of the cap.

12. The system of claim 11, wherein the first bearing comprises a needle bearing element.

13. The system of claim 11, wherein the second bearing comprises an angular contact bearing.

14. The system of claim 11, further comprising a ball separator cage disposed between the second bearing and the first portion of the retention sleeve.

15. The system of claim 11, further comprising a first virtual center corresponding to the first bearing and a second virtual center corresponding to the second bearing, wherein the second virtual center is axially inward of the blade with respect to the blade axis.

16. The system of claim 15, wherein a distance between the first virtual center and the second virtual center is sufficiently large to withstand centrifugal and bending loads sustained during operation of the system.

17. The system of claim 11, wherein the blade further comprises an internal portion having a cavity disposed around a reversing ring.

18. The system of claim 11, wherein the retention sleeve comprises a third race and a fourth race.

19. The system of claim 11, wherein the retention sleeve comprises an annular rib, wherein the first race and the second race are spaced apart by the annular rib, wherein the annular rib is flush with the first race and the second race in the radial direction.

20. The system of claim 11, further comprising a retaining ring disposed radially outward from the retention sleeve with respect to a blade axis, and axially outward from the shim carrier with respect to the blade axis.

* * * * *